(12) United States Patent
Shelley et al.

(10) Patent No.: US 6,984,825 B2
(45) Date of Patent: Jan. 10, 2006

(54) PORTABLE COATING WEIGHT READER

(75) Inventors: Paul H. Shelley, Lakewood, WA (US);
Kathryn A. Soucy, Seattle, WA (US);
Ronald Mellick, Newton, CT (US);
Kenneth Mateer, South Kent, CT (US)

(73) Assignee: The Boeing Company, Chicago, IL (US)

( * ) Notice: Subject to any disclaimer, the term of this patent is extended or adjusted under 35 U.S.C. 154(b) by 336 days.

(21) Appl. No.: 10/361,122

(22) Filed: Feb. 6, 2003

(65) Prior Publication Data
US 2004/0155190 A1 Aug. 12, 2004

(51) Int. Cl.
*G01J 5/02* (2006.01)
(52) U.S. Cl. .............................. 250/339.11; 250/339.06; 250/339.01; 250/338.1; 250/336.1; 324/62
(58) Field of Classification Search ........... 250/339.11, 250/339.06, 339.01, 338.1, 336.1; 324/62
See application file for complete search history.

(56) References Cited

U.S. PATENT DOCUMENTS 5,091,647 A * 2/1992 Carduner et al. ...... 250/339.09
5,381,234 A * 1/1995 Barbee et al. .............. 356/369
5,795,394 A * 8/1998 Belotserkovsky et al. .. 118/665
2002/0152027 A1 * 10/2002 Allen .......................... 701/213
2003/0074095 A1 * 4/2003 Nebauer et al. ............. 700/117

* cited by examiner

*Primary Examiner*—David Porta
*Assistant Examiner*—Christine Sung
(74) *Attorney, Agent, or Firm*—Black Lowe & Graham, PLLC

(57) ABSTRACT

A portable system for non-destructively measuring amount of coating on a metallic substrate based upon infrared absorbance includes a portable, hand-held measurement unit housed in a pistol-gripped case and an optical sensing unit that has an infrared source and a detector. The infrared source is configured to transmit infrared energy toward a metallic substrate having a coating thereon. The infrared energy passes through the coating, reflects off a surface of the substrate, passes back through the coating, and is detected by the detector. A processor correlates amount of infrared absorbance in the coating to amount of the coating. A base unit holds the hand-held measurement when not in use and charges a battery of the hand-held measurement unit. The base unit includes connectors for uploading and downloading data from and to the hand-held measurement unit and for communicating with an optional host computer.

35 Claims, 20 Drawing Sheets

PORTABLE COATING WEIGHT READER

FIELD OF THE INVENTION

This invention relates generally to analytical instruments and, specifically, to infrared analytical instruments.

BACKGROUND OF THE INVENTION

Metals are coated with a variety of coatings for a number of purposes. For example, aluminum aircraft parts often receive an anodized coating for corrosion resistance and for enhanced paint adhesion. Anodize coatings are also used for decorative purposes. Further, titanium foil is frequently covered with a sol-gel coating when forming laminate structures where the sol-gel promotes adhesion of the various layers in the structure. Also, chromated conversion coatings prevent corrosion and promote paint adhesion when applied to aluminum and other metal.

Generally, a uniform coating amount or a coating amount within an acceptable range is desired. However, determining uniformity of the coating amount or quantifying the coating amount relative to a desired range may be difficult.

Current coating amount testing methods are destructive and therefore cannot be used with final production products. They are also time consuming, environmentally unfriendly, and disruptive to large scale production processes.

For example, current testing known in the art for amount of anodize coating or chromated conversion coating is performed by measuring the weight of a coated metallic test specimen. The coating is then chemically removed from the specimen. The metallic substrate is reweighed and the difference is the amount of the coating, which is normally given in milligrams per square foot (mg/ft2). Because the test method is destructive, it cannot be used on the manufactured product. In addition, the currently known testing process only generates a spatially averaged coating amount for the sample. As such, the currently known testing process does not determine coating amount variations over an area.

Current testing known in the art for sol-gel thickness is performed by sputtering away the sol-gel coating using depth profiling Auger spectroscopy or Glow Discharge Optical Emission Spectroscopy (GD-OES). These methods gradually remove the sol-gel coating and can determine where the sol-gel ends and the metal substrate begins. Sol-gel thickness is measured by calibrating the sol-gel removal rate and measuring the time required to remove the sol-gel layer. In addition, the currently known testing methods make very small measured spots for coating thickness on the sample. As such, the currently known testing processes require many time-consuming measured spots to determine coating thickness variations over an area.

Therefore, there is an unmet need in the art for a portable system for non-destructively determining an amount of a coating on a metallic substrate that can be used during on-line processing of the metallic substrate.

SUMMARY OF THE INVENTION

The present invention provides a portable coating weight reader. The coating weight reader of the present invention is a lightweight, portable system for non-destructively measuring amount of a coating on a metallic substrate based upon absorbance of infrared energy by the coating. The present invention provides for repeatability of measurements, ease of measuring during production processes, and (via an optional external host computer) statistical analysis and display of measurement data.

An embodiment of the present invention provides a portable system for non-destructively measuring amount of a coating on a metallic substrate based upon infrared absorbance in the coating. The system includes a portable, hand-held measurement unit and a base unit. The measurement unit is preferably battery-operated, is suitably housed in a hand-held pistol-gripped case, and includes an optical sensing unit that has an infrared source and a detector. The infrared source is configured to transmit infrared energy toward a metallic substrate having a coating thereon. The infrared energy passes through the coating, reflects off a surface of the substrate, passes back through the coating, and is detected by the detector. A processor is configured to correlate an amount of infrared absorbance in the coating to an amount of the coating. The coating's absorbance value suitably is determined with the Beer-Lambert Law that defines absorbance as $$Abs = \log I_o / I_a$$

where $I_o$ is the value of a reference wavelength output (or a zeroing reference value) and $I_a$ is the value of an analytical channel output of infrared energy detected by the detector. The base unit holds the hand-held measurement when not in use and charges the battery of the hand-held measurement unit. The base unit also suitably includes connectors for uploading and downloading data from and to the hand-held measurement unit and for communicating with an optional host computer.

BRIEF DESCRIPTION OF THE DRAWINGS

The preferred and alternative embodiments of the present invention are described in detail below with reference to the following drawings.

DETAILED DESCRIPTION OF THE INVENTION

Figure 1:
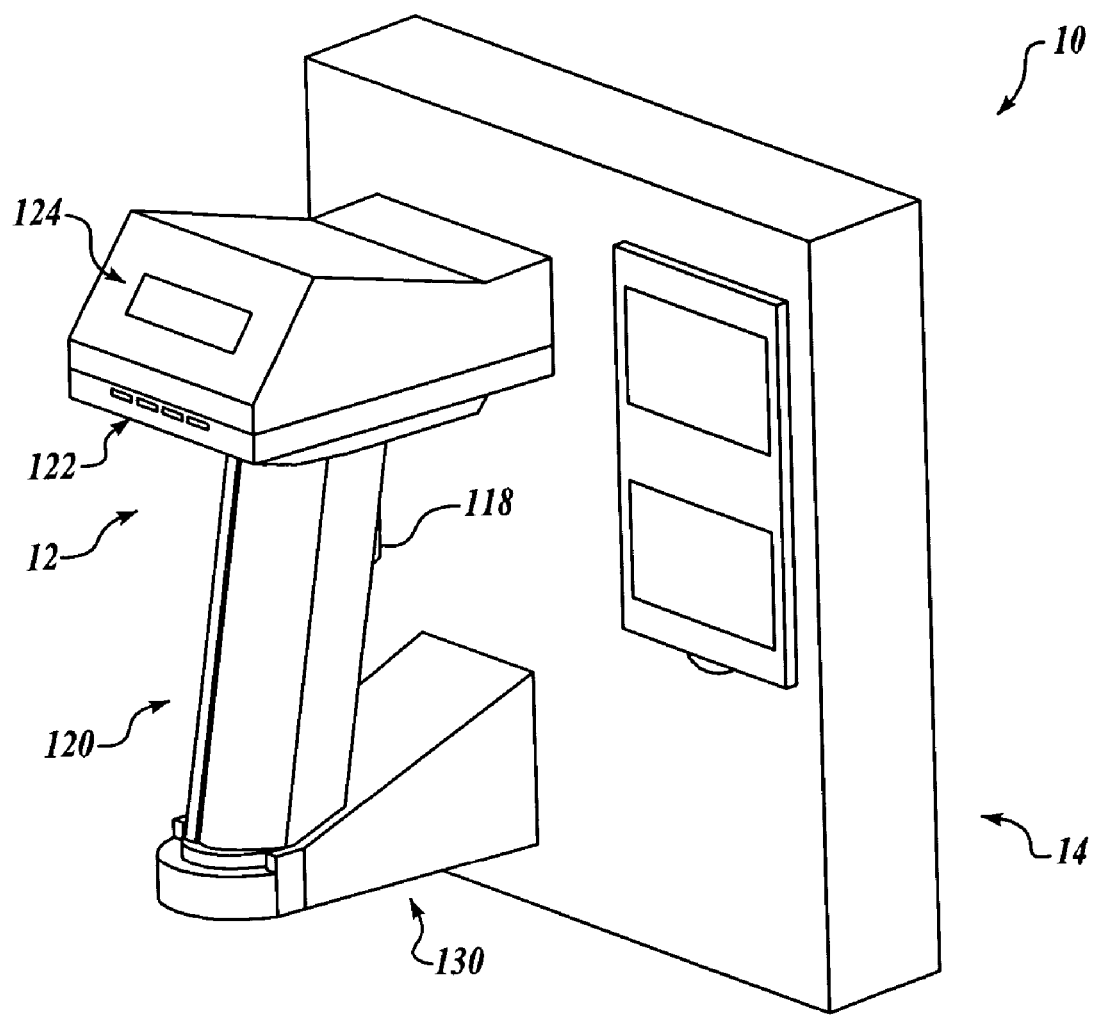
FIG. 1 is a perspective view of an embodiment of a system of the present invention.
Figure 2:
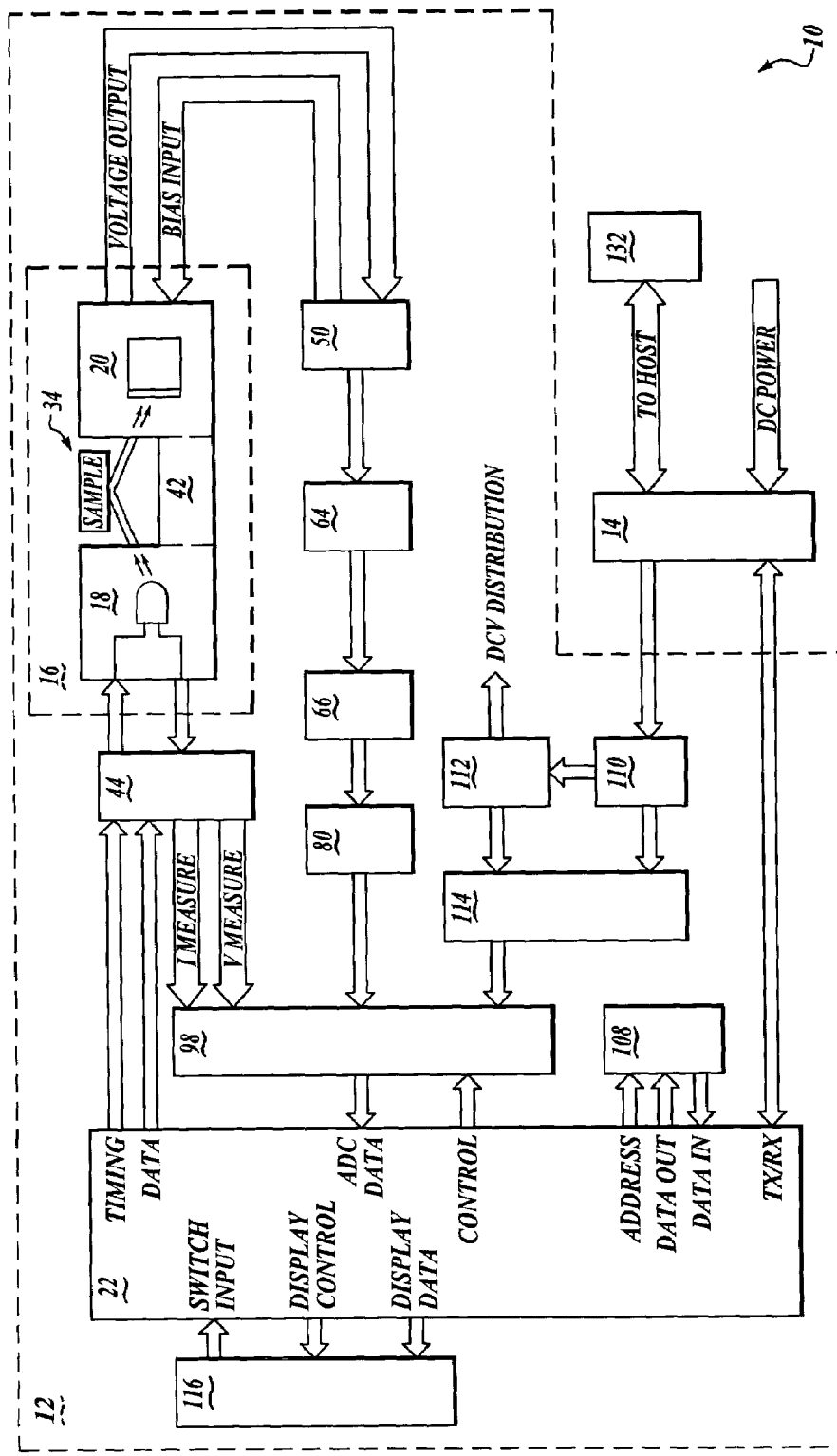
FIG. 2 is a block diagram of an embodiment of the invention.

Referring to FIGS. 1 and 2 and by way of overview, an embodiment of the present invention provides a portable system 10 for non-destructively measuring amount of a coating on a metallic substrate (not shown) based upon infrared absorbance in the coating. The system 10 includes a hand-held measurement unit 12 and a base unit 14. The measurement unit 12 is preferably battery-operated, is suitably housed in a pistol-gripped case, and includes an optical sensing unit 16 that has an infrared source 18 and a detector 20. The infrared source 18 is configured to transmit infrared energy toward a metallic substrate having a coating thereon. The infrared energy passes through the coating, reflects off a surface of the substrate, passes back through the coating, and is detected by the detector 20. A processor 22 is configured to correlate an amount of infrared absorbance in the coating to an amount of the coating. The coating's absorbance value suitably is determined with the Beer-Lambert Law that defines absorbance as $$Abs = \log I_o/I_a$$

where $I_o$ is the value of a reference wavelength output (or a zeroing reference value) and $I_a$ is the value of an analytical channel output of infrared energy detected by the detector 20. The base unit 14 holds the hand-held measurement 12 when not in use and charges the battery of the hand-held measurement unit 12. The base unit 14 also suitably includes connectors for uploading and downloading data from and to the hand-held measurement unit 12 and for communicating with a host computer 132. Details of a present embodiment of the invention are set forth below by way of non-limiting example.

The hand-held measurement unit 12 will be discussed first, followed by the base unit 14. Finally, exemplary screens presented by the host computer 132 are discussed.

Hand-Held Measurement Unit

The hand-held measurement unit 12 includes a sample stage 34 that includes the infrared source 18 and the detector 20, analog circuits for conditioning and measuring signals from the detector 20, and digital circuits including the processor 22 for processing the conditioned signal and for controlling the system 10.

Figure 3:
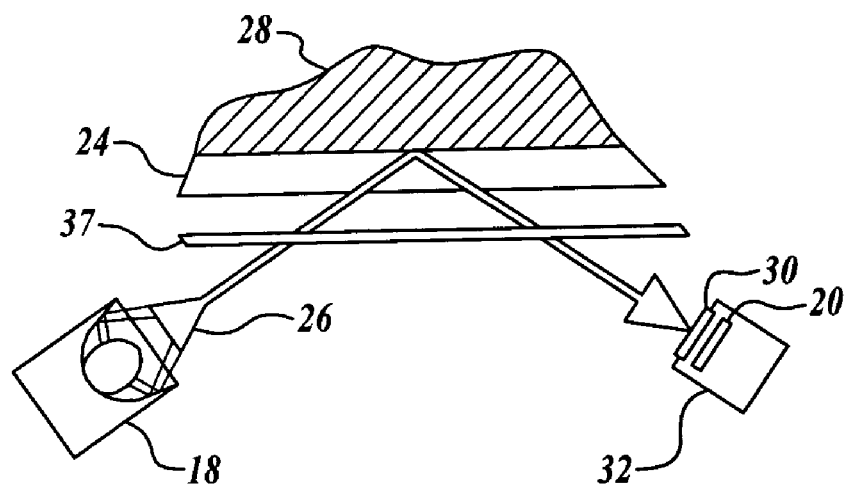
FIG. 3 is a block diagram in partial schematic form of optics.
Figure 4:
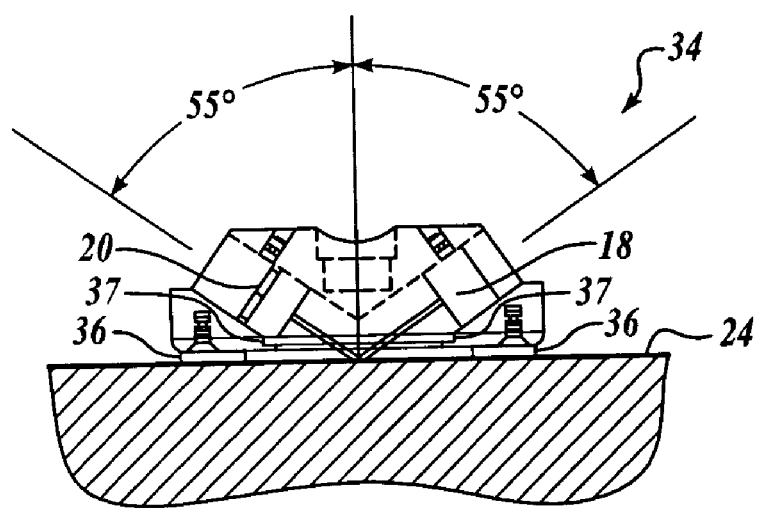
FIG. 4 is a partial cutaway side view of a sample stage.
Figure 5:
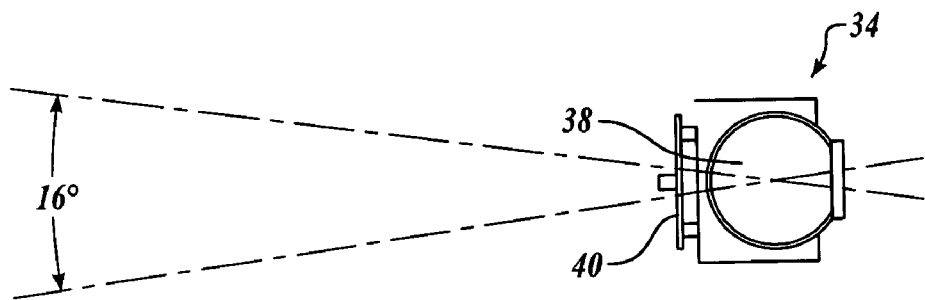
FIG. 5 is a side view of rotation of the sample stage.

As is known, most substances absorb light energy at various wavelengths from short wave ultraviolet to long wave infrared. Referring now to FIGS. 1–3, advantageously the system 10 is designed to detect changes in light energy in the mid-infrared range of around 10.8 μm due to absorbance by a coating 24 and to analyze extremely low output voltage changes in signals from the detector 20 due to absorbance of the light energy. The source 18 is suitably any acceptable infrared source that generates infrared energy 26 having a wavelength suitably in the mid-infrared range of around 8 μm to around 12 μm, and in one presently preferred embodiment around 10.8 μm. In one non-limiting example, the source 18 has a maximum power output of around 2.0 Watts, a peak spectral range of around 8 microns to around to 12 microns, a voltage range of around 0 volts to around 10 volts with a typical maximum voltage of around 6 volts, a coarse resolution of around 1.22 mV coarse and a fine resolution of around 122 μV, a modulation frequency that is suitably programmable between around 1 Hz to around to 16 Hz, a duty cycle of around 1% of period resolution and a typical duty cycle of around 50%, and power control that is suitably constant power monitoring and adjustment. However, other sources with other operating characteristics or that generate infrared energy in other infrared ranges, including broadband infrared energy, may be used as desired for a particular application.

The detector 20 is suitably a single channel pyroelectric detector with a single sensing element or a dual channel pyroelectric detector with dual sensing elements. Either a single element detector (with no built in reference) or a dual element detector (that has a built in reference) can be used as desired. However, it will be appreciated that use of a system that includes a single element detector entails more frequent zeroing corrections against an uncoated reference substrate than does a system with a dual element detector. The sensing elements are light-sensitive crystals such as without limitation pyroelectric crystals. The pyroelectric crystals are heated by the infrared energy 26 reflected off a surface of a substrate 28 of a sample to be measured. Acceptable pyroelectric crystals include without limitation lithium tantalite crystals.

Fixed narrow bandpass filters 30 are suitably mounted over the light sensitive crystals of the detector 20. The filters 30 are selected to pass infrared light to the crystals at the same wavelength as the absorbance bands of the coating 24 and the reference substrate (if a dual element detector is used). In one non-limiting example, the infrared energy 26 is filtered with a narrow band filter 30 of around 10.8 micron (926 $cm^{-1}$). The 10.8 micron filter is suitably used when a measurement is made of a sample with a boric sulfuric acid anodize coating or an alodine coating. However, it will be appreciated that filters with other bandpass frequency ranges may be used as desired to measure other coatings. For example, an 11.2 micron filter is suitably used when a measurement is made of a sample with a phosphoric acid anodize coating. In one embodiment, the filter 30 is suitably located inside a housing 32 that houses the detector 20. Given by way of non-limiting example, the housing 32 is suitably a TO-5 housing. However, in another embodiment the filter 30 is acceptably located with the source 18 such that the infrared energy 26 is filtered before being absorbed in the coating 24. It will be appreciated that only the infrared energy 26 passing through the filter 30 heats the pyroelectric crystal of the detector 20. It will also be appreciated that for dual channel detectors, an initial filter is suitably a broadband filter window positioned as an input window of the housing 32. In this case, a narrow band analytical filter and a reference filter are suitably mounted over respective pyroelectric elements inside the housing 32.

Referring now to FIGS. 2–5, an exemplary sample stage 34 contains the infrared source 18 and the detector 20. The sample stage 34 is advantageously of a modular, plug-in design that does not require any hard-wired connections to other circuitry of the hand-held measurement unit 12. This permits ease of changeover of the sample stage 34 to measure other samples. The sample stage 34 also slides out for easy access to the infrared source 18 and the detectors 20 for servicing. Accessible screws suitably lock the sample stage 34 to the hand-held measurement unit 12 when the sample stage 34 is in place. If desired, the sample stage 34 may be sealed with an optically transparent material, such as without limitation zinc selenide or barium fluoride, to prevent contamination of optical components located within the sample stage 34.

Standoff pads 36 are affixed to a face of the sample stage 34. The standoff pads 36 are placed against a surface of a sample to be measured to protect the surface of the sample. If desired, an optically transparent window 37 may be provided to protect the infrared source 18 and the detector 20. A rotating component 38 allows the sample stage 34 to traverse radially or rotate a desired amount with respect to the sample surface to maintain contact with the surface. In one embodiment, the rotating component 38 allows the sample stage 34 to rotate about ±8 degrees.

The sample stage 34 also contains an interface circuit 40. The interface circuit 40 interconnects the sample stage 34 to other circuitry of the hand-held measurement unit 12. The interface circuit 40 suitably includes an edge-style connector for conducting signals from the infrared source 18 and the detector 20 to circuitry of the hand-held measurement unit 12 when the sample stage 34 is plugged into the hand-held measurement unit 12. A sense signal (such as a loop back ground) suitably provides a signal indicative of whether or not the sample stage 34 is plugged into the hand-held measurement unit 12.

The sample stage 34 includes a sample stage configuration memory 42. The memory 42 suitably stores configuration and calibration tables pertinent to the sample stage 34. The memory 42 advantageously contains calibration data for converting absorbance units to coating weights for each alloy to be measured. It also contains setup conditions for the source 18 and the detector 20, including source frequency, duty cycle, voltage level, and power control point. It also includes measurement averaging and pre-measurement delay conditions, detector analytical and reference channel definitions, and peak timing conditions for each channel. The memory 42 stores values of $I_o$, that is the values of a reference wavelength output (or a zeroing reference value) for the alloy to be measured without a coating on the alloy. Given by way of non-limiting example, the memory 42 is suitably a non-volatile serial memory, such as a 16K×1 electrically erasable programmable read-only memory (EEPROM). Advantageously, this design allows for rapidly changing sample stages without recalibrating the system 10 or resetting test conditions. Because the configuration data for an alloy to be measured is stored in he memory 42, switching from measuring one alloy to another, different alloy is easily accomplished. This switch is made by merely replacing the sample stage 34 whose memory includes configuration data for the one alloy with another sample stage 34 whose memory 42 includes configuration data for the other, different alloy. As a result, the system 10 readily converts to new source and measurement conditions and has available the calibration data for converting absorbance units to coating weights for the alloy to be measured with the particular sample stage 34.

The optical raypath through the sample stage 34 is as follows. The infrared energy 26 passes from the source 18 through the optional window 37, through the coating 24, reflects off the surface of the substrate 28, passes back through the coating 24 and through the optional window 37, then passes through the filter 30 and to the sensing element of the detector 20. The total distance of the infrared energy 26 passing through the coating is the optical pathlength. In one embodiment, an angle of incidence of the infrared source 18 to the surface of the substrate 28 is around 55 degrees for measuring relatively thick coatings, such as anodize coatings. The detector 20 is positioned at a complimentary angle to accept the reflected light. It will be appreciated that other angles can be established as desired for a particular application depending upon the coating 24 to be measured. This is because the optical pathlength through a coating varies with chemical makeup of the coating 24. For example, an angle of incidence of around 75 degrees is suitably used for measuring relatively thinner coatings, such as sol gel and chromated conversion coatings.

Figure 6:
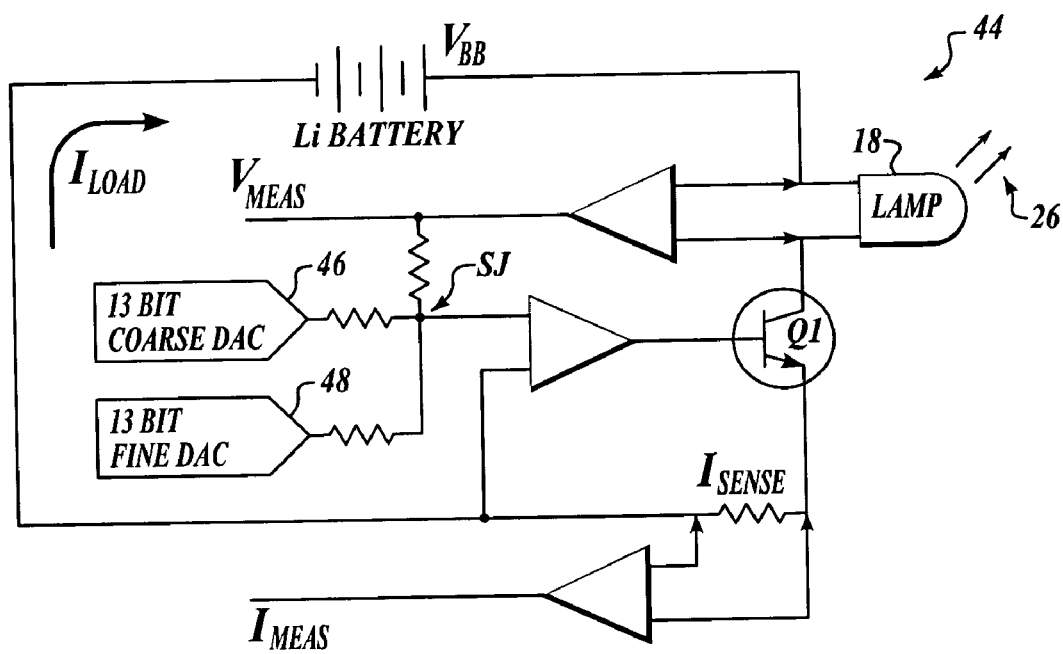
FIG. 6 is a schematic diagram of a source control circuit.

Referring now to FIGS. 2 and 6, an exemplary source control circuit 44 suitably provides programmed power for the infrared source 18 using a current sink drive method for source power control. By using this technique, the system 10 will suitably operate within specifications when the battery voltage drops to around 6 volts. Given by way of non-limiting example, programming of the source voltage utilizes 13 bit digital-to-analog converters (DACs) for both coarse and fine adjustment settings. A coarse DAC 46 is suitably set to around 95% of the desired value and a fine DAC 48 is suitably used in a range of around 95% of the desired value to around 105% of the desired value.

Voltage for the infrared source 18 is suitably controlled by using a 4 wire Kelvin connection. This advantageously minimizes errors due to wire drop connections to the infrared source 18. In one embodiment, full-scale programmed voltage range of the source supply is 10 volts ±1 volt. However, programmed voltage may be limited by the battery voltage minus the saturation voltage of transistor Q1 minus a voltage drop across resistor Isense minus a voltage drop through loop I Load. Given by way of non-limiting example, a typical maximum voltage limit is suitably 6 volts across the infrared source 18.

Source power control suitably uses a power monitor and control algorithm. The source voltage is programmed and the actual voltage and I Load current are periodically measured for value. Power is calculated by using the formula P=VI, where V is the measured lamp voltage and I is the I Load current. The programmed voltage is adjusted until the desired power output is obtained. In one embodiment, the DACs 46 and 48 set the lamp voltage based on 10 volt full scale ranging. The coarse DAC 46 suitably has a bit weight of around 1.22 mV and the fine DAC 48 suitably has a bit weight of 122 $\mu V$. Typically, only the fine DAC 48 is dynamically adjusted for keeping lamp power constant.

Figure 7:
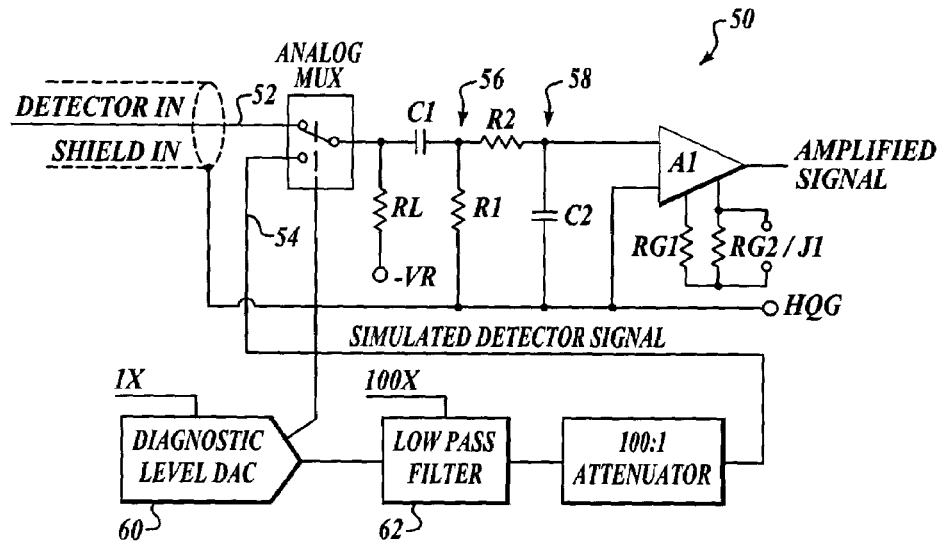
FIG. 7 is a schematic diagram of an input stage.

Referring now to FIGS. 2 and 7, the infrared energy 26 falling onto the crystals of the detector 20 and the resulting heat causes a current to flow from the crystal into an exemplary input stage 50. The input stage 50 includes two identical signal channels that connect to either outputs 52 of the detector 20 from the sample stage 34 or a simulated detector signal 54 that is provided for diagnostic purposes. For ease of description, only one signal channel is described. It will be appreciated that the second channel is substantially identical in function but suitably has independent controls for gain settings. A resistor RL provides a load current for biasing the detector 20. The detector output 52 is typically around 0 volts. The load current is suitably set for around 25 microamperes according to the relationship Vr/RL. A capacitor C1 and a resistor R1 set a first pole of an integrated high pass filter 56 with a frequency response of −40 db at 0.1 Hz. A corner frequency for the filter 56 is set at around 1 Hz. A resistor R2 and a capacitor C2 form a one-pole, low pass filter 58 that has a corner frequency set to around 1.6 KHz. The low pass filter 58 advantageously eliminates transients that may cause saturation and aggravated noise conditions.

An amplifier A1 receives an output signal from the low pass filter 58. The amplifier A1 is suitably a high-quality, instrumentation-type differential amplifier that has very low noise specifications and will not contaminate the measured signal. The amplifier A1 suitably has a selectable fixed gain setting that is factory-set to accommodate the detector 20 being used. Acceptable selected fixed gain values are without limitation 20 or 100.

The diagnostic level simulated detector signal 54 starts as a pulse output from a 13 bit DAC 60 and is filtered by a low pass filter 62 to an AC-type test signal with an 8 pole clocked filter. The signal 1X generates a test pulse from 0 volts to a programmed level at the same modulation frequency as the source. The full scale value of the simulated test signal is about 16 mVrms at the input of the amplifier A1 and has a setting resolution of 2.0 micro volts. The test signal 54 is suitably used in a diagnostic checker program.

Figure 8:
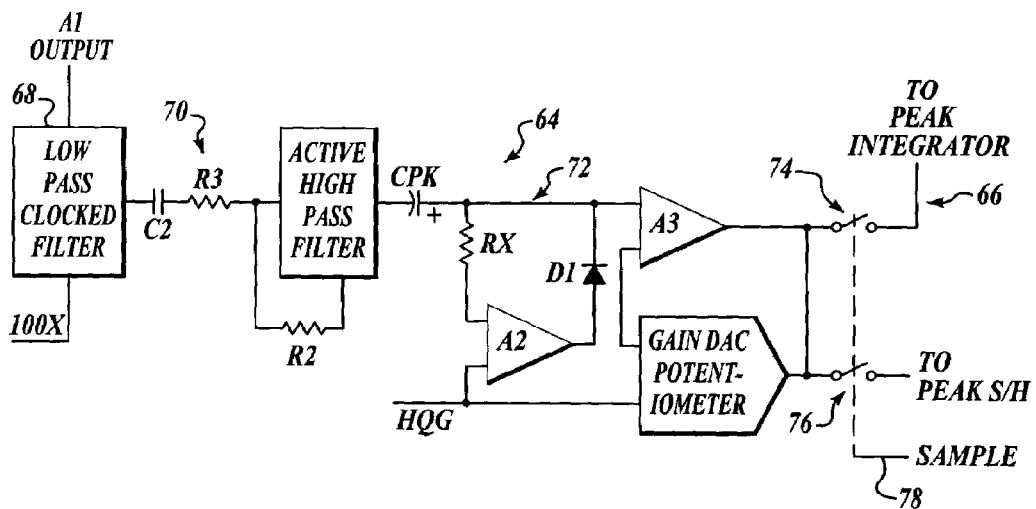
FIG. 8 is a schematic diagram of a signal conditioner.

Referring now to FIGS. 2 and 8, exemplary signal conditioning circuits 64 and 66 provide independently programmed gain control and conditioned analog signals that are shifted to plus 2 peak-to-double resolution of the measured signal. The function of the signal conditioning circuits 64 and 66 is to provide a timed peak sample and hold value for each detector channel to a subsequent measurement process for analog-to-digital conversion with optimum results.

An input filter 68 is suitably an 8-pole, low pass clocked filter that is clocked at around 100 times the modulation frequency of the source 18. This sets the frequency corner $f_o$ of the filter 68 to substantially the same frequency as that of the source 18 to maximize high frequency noise suppression. A capacitor C2 and a resistor R2 form a high pass filter 70 that is a second pole of an integrated high pass network continued from the input stage 50. A corner frequency of the high pass filter 70 is also set for 1 Hz. However, a band gap stop is set for 1.5 Hz by the capacitor C2 and a resistor R3. Advantageously, this helps flatten AC response of the signal conditioning circuits 64 and 66 through the source frequency programmable range.

A capacitor Cpk, an amplifier A2, and a diode D1 form a precision level shifting network 72. Previous to this, the signals have been bipolar AC signals. The level shifting network 72 shifts the negative peak value to 0 volts by using a precision negative clamp, using the amplifier A2 and the diode D1, to force the negative peak voltage to charge the capacitor Cpk to a peak voltage value Vpk. This creates a signal level of 0 to plus 2 peak volts at an input terminal of an amplifier A3. A combination of the amplifier A3 and a Gain DAC Potentiometer is suitably a 256 step gain stage. The gain formula is suitably 1+Dn/(256−Dn) where Dn is a programmed value of 0 to 255.

A resistor Rx is selected to trickle discharge the capacitor Cpk to advantageously eliminate any noise condition that may cause the charge voltage to exceed the true negative peak value. The discharge frequency is suitably set at around 0.3 Hz.

Figure 9:
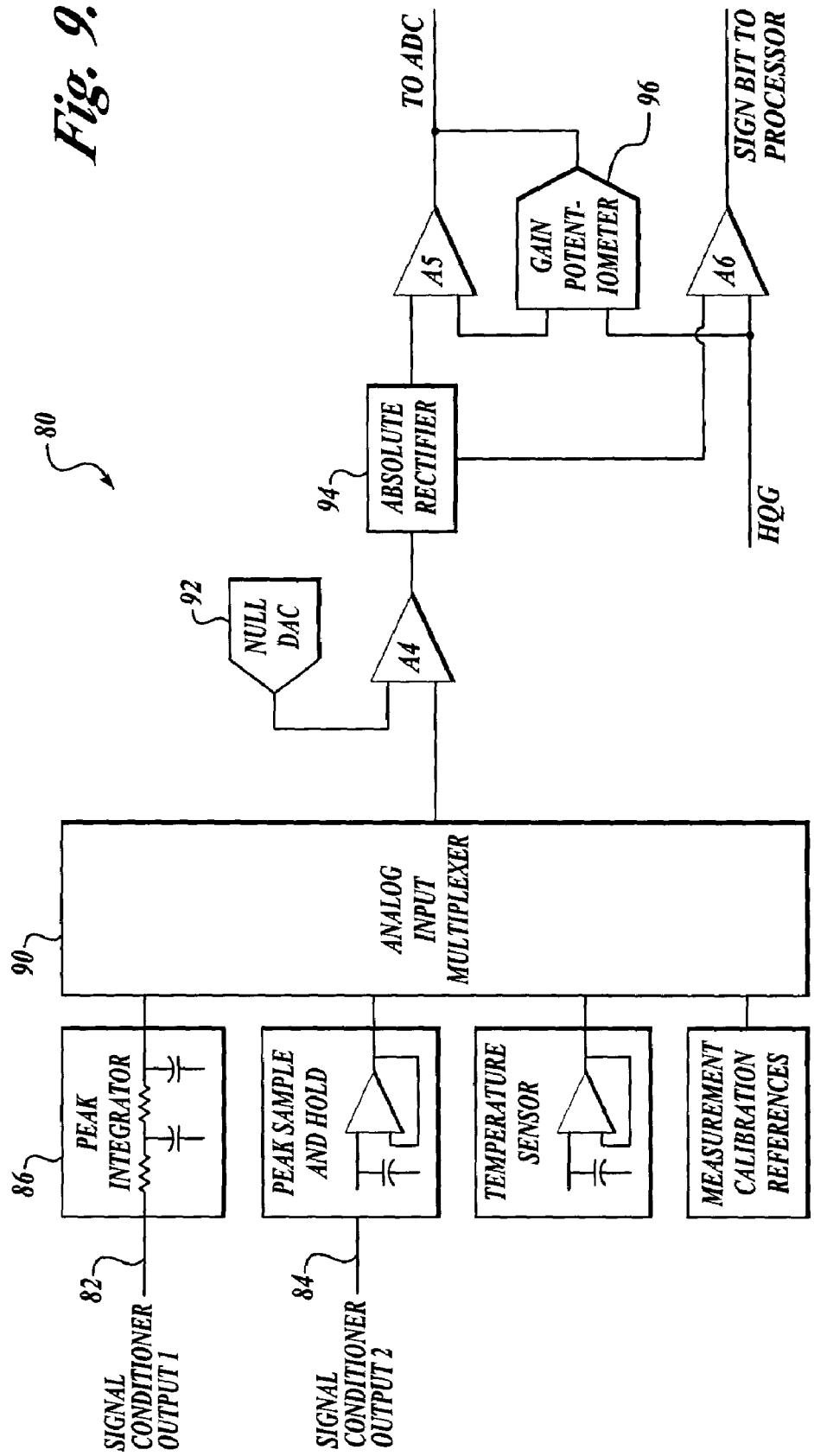
FIG. 9 is a block diagram of a measurement stage.

Two analog switches 74 and 76 and a sample timing signal 78 at the output of the signal conditioner circuit 66 sample the 2 Peak plus gain signal voltage and connect the conditioned signal to an input of a measurement stage 80 (FIG. 9). It will be appreciated that the sample timing of peak measurements is synchronous to source modulation frequency timing signal 1X (FIG. 7). Therefore, an initialization process for the system 10 suitably performs a peak search algorithm that finds the absolute peak voltage value with respect to the timing signal 1X. Once found, the timing is fixed and the timing delay is stored in the memory 42.

Referring now to FIGS. 2 and 9, the signal conditioning circuits 64 and 66 (FIG. 8) and the measurement stage 80 optimize accuracy and stability of measurements made by the system 10 through use of gain, filtering, and sample and difference measurement techniques. The measurement stage 80 uses a sample and difference measurement technique. As discussed above, output voltage from the detectors 20 is proportional to the infrared energy 26 received from the infrared source 18. Accordingly, the highest output voltage results from reflection from sample of a zero reference substrate that does not absorb any of the infrared energy 26 emitted by the infrared source 18 (hereinafter referred to as a reference substrate). It will be appreciated that the output voltage from the detector 20 decreases as the infrared energy 26 presented to the sensing element of the detector 20 drops from a finite amount of the infrared energy 26 being absorbed by the coating 24. Advantageously, an important measurement factor is therefore how much the output from the detector 20—an analog signal—changes when a coated sample is being measured. The absolute value of the analog signal from measurement of the reference substrate is therefore useful as a reference starting point.

To maximize analog-to-digital (ADC) conversion accuracy for measuring the analog signal absorbance difference, the measurement circuit 80 "subtracts" out of the signal path the magnitude of the value of a voltage that is output from the detector 20 for reflection of the infrared energy 26 from the reference substrate. This subtraction sets the input to the ADC close to zero volts before sample measurement begins. Advantageously, this enables full use of ADC input gain stage multipliers to maximize resolution of the measured absorbance voltage.

Output signals from the signal conditioner circuits 64 and 66 are applied to inputs 82 and 84 of the measurement stage 80. The input 82 is connected to a charge coupled integrator 86 for long term peak averaging. This input is intended for trend monitoring applications and is suitably not used for measurements of the coating 24. Instead, the input 84 provides a measurement path for signals. The input 84 is connected to a fast acquisition sample and hold amplifier 88 that is configured to hold the analog peak value during analog-to-digital conversion. It will be appreciated that previous to this point, all of the signal processing has been alternating current (AC) processing to minimize preamp errors to amplifier Vos temperature drifts. As is known, AC circuits keep Vos drifts at unity gain. However, after this point, all analog signal processing is suitably direct current (DC) processing.

An output signal from the sample and hold amplifier 88 is connected through a multiplexer, such as without limitation a precision analog multiplexer 90, to one input of a differential amplifier A4. The amplifier A4 is without limitation a precision ultra-low noise instrumentation amplifier. The other input to the amplifier A4 is from a DAC, such as without limitation a 13 bit Null DAC 92. In furtherance of preparing the analog signal for "sample and difference" measurements, the DAC 92 is suitably programmed to the same voltage level as the output of the sample and hold amplifier 88. This sets the output of the amplifier A4 to zero volts.

The measurement stage 80 is suitably designed as a sign + magnitude conversion product. That is, all sixteen bits of the A/D converter are used to convert the absolute value of the analog signal. The sign is developed outside of the converter and is effectively another bit of resolution. Therefore, since sample and difference measurement values can change to either a positive or negative direction, the output from the amplifier A4 is connected to a rectifier, such as a precision absolute rectifier 94. The rectifier 94 rectifies any negative voltages and sets the sign bit at the output of the amplifier A4 before the analog measurement signal is presented to ADC input gain stage amplifier A5. The amplifier A5 and a gain potentiometer 96 enable adjusting gain multipliers of 1 to 256 to maximize the conversion resolution of the measured signal. The gain formula is 1+Dn/(256−Dn) where Dn is a programmed value of 0 to 255.

Figure 10:
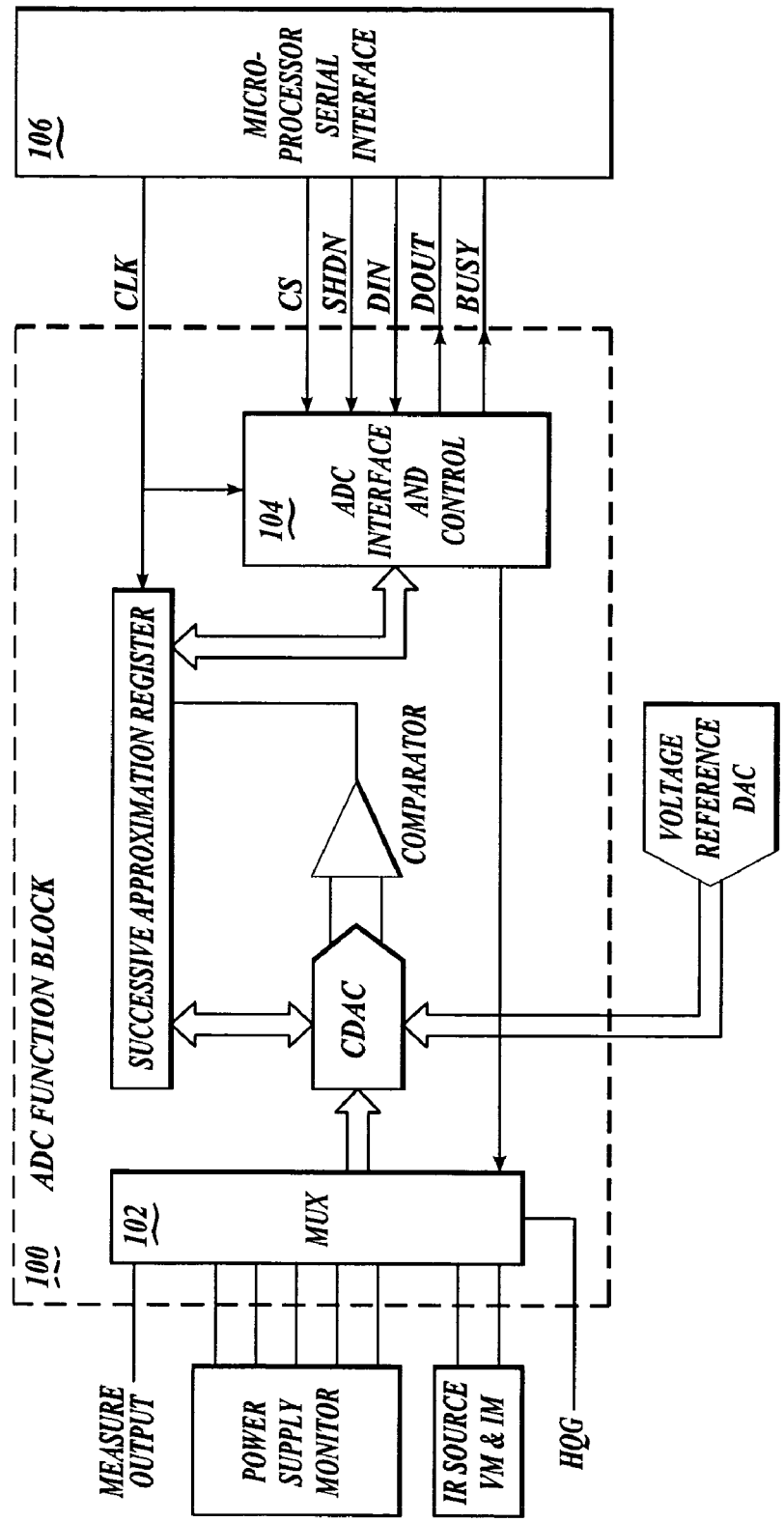
FIG. 10 is a block diagram of an analog-to-digital converter.

Referring now to FIGS. 2 and 10, an exemplary conversion circuit 98 suitably includes without limitation an 8-channel, 16-bit, sampling ADC 100. Output of the ADC 100 interfaces directly to the microprocessor 22 (FIG. 2) via a synchronous serial interface 102. The ADC 100 is suitably without limitation a high speed, ultra-low noise successive approximation converter that uses capacitive storage DAC conversions when sampling. Reference voltage input to the ADC 100 is suitably programmable from around 500 mV to around 5 volts to maximize conversion resolution of the output signal from the amplifier A5 of the measurement stage 80 (FIG. 9).

Referring now to FIGS. 2, 9, and 10, the following non-limiting example explains conversion power range of the measurement stage 80. The measurement stage 80 suitably has a null setting resolution of 610 microvolts using the 13-bit Null DAC 92.If a measure output gain of 256 were used (as determined by the amplifier A5 and the gain potentiometer 96), the zero output resolution from the measurement stage 80 would be 156 millivolts. The ADC 100 with the reference set to 500 millivolts would yield a bit weight value of 7.6 microvolts. The 156 millivolts divided by 7.6 microvolts would generate 20,447 bits of data. This means the original 610 microvolt setting in the measurement stage 80 could be converted to a resolution of 30 nanovolts. It will be noted that a typical gain-adjusted peak value in the signal conditioning circuit 64 is 3.6 volts. This means that by using sample and difference measurement, absorbance changes on a 3.6 volt signal could be measured to a resolution of 30 nanovolts or 80 micro percent. However, typical settings for the reference voltage for the ADC 100 is suitably adjusted to generate bit weight values that are weighted for math requirements, such as without limitation 50.0 microvolts per bit achieved with a 3.277 volt reference input.

Besides the output from the amplifier A5 of the measurement stage 80, in one exemplary non-limiting embodiment up to 7 more analog inputs are input to a multiplexer 102 and can be selected by firmware for ADC conversion.

Referring back to FIG. 2, control and measurement architecture is based around the processor 22. Given by way of non-limiting example, the processor 22 is suitably a Microchip PIC17C766 sixteen bit microprocessor. The processor 22 is coupled to system memory 108 that suitably includes non-volatile static random access memory (nvSRAM) for data storage and that is supplemented with the sample stage configuration memory 42 (that physically resides in the sample stage 34 in one embodiment) for test configuration and calibration records. The system memory 108 also incorporates a real time clock.

The processor 22 controls all of the functions of the system 10. A large input/output (I/O) capacity of the processor 22 suitably provides for all of the timing and setting needs of electronic circuitry within the hand-held measurement unit 12 while minimizing a need for external peripheral logic devices. In one embodiment, the processor 22 is suitably packaged in an 84 pin PLCC device mounted in a socket on a control circuit board. Besides state sensitive control for external hardware functions, the processor 22 provides several forms of serial protocol output/inputs for device control and communications, such as without limitationinteger-integer circuit (I$^2$C), serial peripheral interface (SPI) and 2 full duplex universal synchronous asynchronous receiver transmitters (USARTs) for communications. In one embodiment, the ADC 100, DACs 46, 48, 60, and 92, and GAIN potentiometer 96 are all operated from an SPI port (not shown) while the sample stage configuration memory 42 operates from an I$^2$C port (not shown). Two USARTs (not shown) provide for two RS-232 interfaces (not shown).

Logic for the processor 22 suitably includes enough memory to store all accumulated test results with real time clock stamp signatures obtained between upload connections to the host computer 132. In one embodiment, RAM capacity is suitably 256 Kb organized as 32K×8. Hardware memory is suitably the memory 108 with a full function real-time clock (RTC). Data integrity is suitably secured in EEPROM and is advantageously not subject to battery or capacitor discharge.

Figure 11:
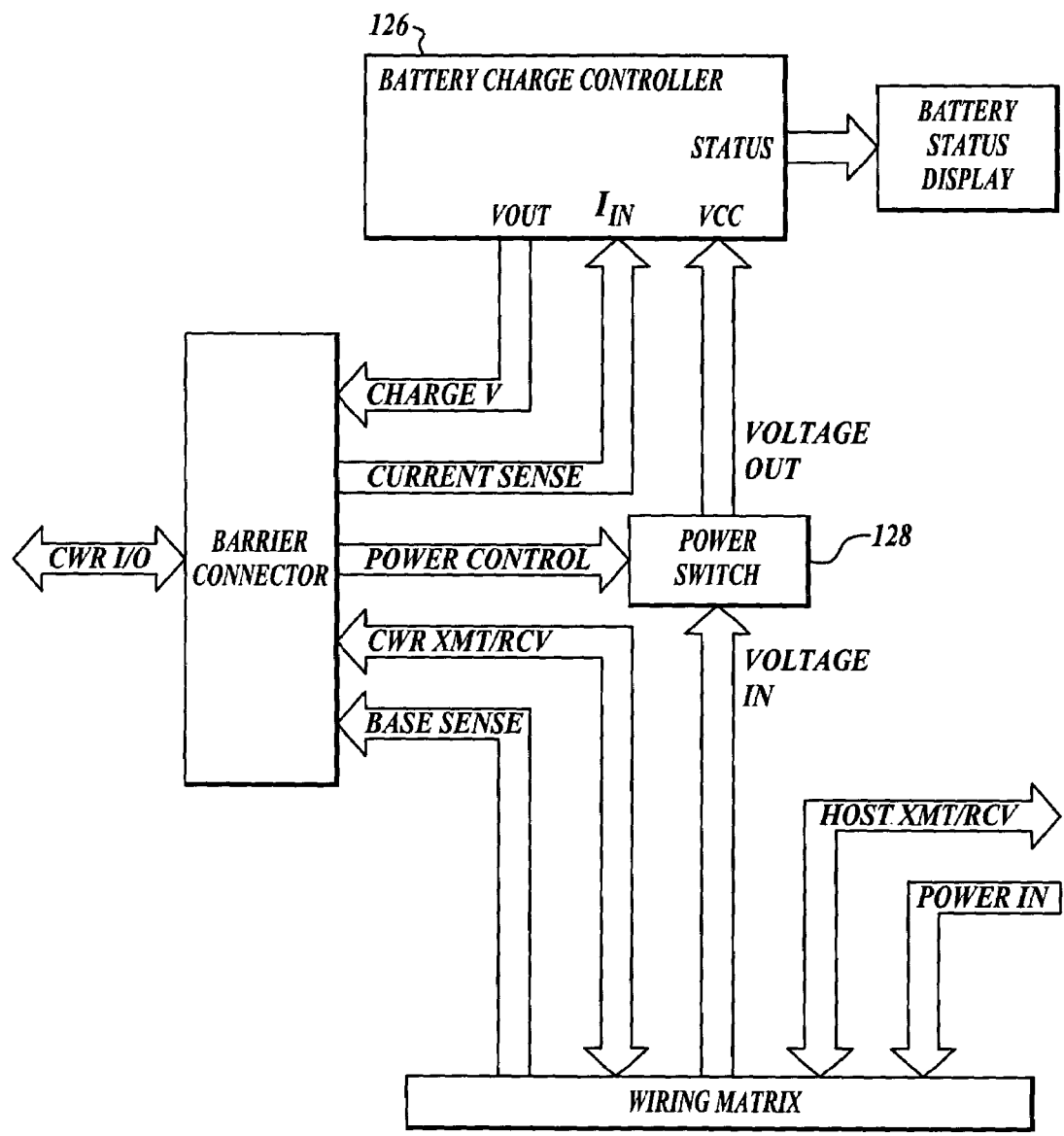
FIG. 11 is a block diagram of a base unit.

Referring now to FIGS. 2 and 11, a current rating of the battery limits the power applied to the infrared source 18. A battery 110, such as without limitation a two cell Lithium Ion battery, is provided that suitably can deliver around 1.65 amperes DC or up to around 2.4 amperes pulsed. Preferably, the battery 110 supplies up to a maximum current bounded by around 5.0 volts across the infrared source 18, or around 12 watts. The battery 110 suitably has a power factor rating of around 1.65 Ah DC. Therefore, if the infrared source 18 is utilized at full power for 100% of the time between recharging, then the recharge cycle would be once every hour. Dependent on use of the system 10, actual power drain will typically be much less and recharge cycles may be several hours.

The infrared source 18 is not the only load drawing current from the battery 110. All of the active circuitry internal to the hand-held measurement unit 12 uses battery power through use of step down linear voltage regulators 112 supplying circuitry bias.

A power supply monitor 114 monitors continuously checks DC power sources and HQ ground in a background mode for out of tolerance conditions. If any one of the supplies fails a tolerance limit test, an error condition will abort the sample test result and inform the operator of the condition.

The voltage value at the infrared source 18 and the current value through the infrared source 18 may both be selected by the multiplexer 102 (FIG. 10) for conversion. However, direct measure of these signals may damage the ADC 100. It will be appreciated that voltages exceeding 5VP+0.2 volts at the inputs of the multiplexer 102 are avoided. Therefore, the source voltage and current signals are connected to the multiplexer 102 through a divide-by-3 attenuator pad.

Referring now to FIGS. 1 and 2, an exemplary user interface 116 suitably includes five non-latching, momentary-on user input switches interfacing directly to the processor 22. One of the switches is advantageously a trigger style switch 118 located on a handle 120 of the hand-held measurement unit 12. Actuating the switch 118 causes the system 10 to enter a sample measurement run cycle for collecting data. Four other switches 122 are located beneath a display, such as a vacuum fluorescent display (VFD) 124. One switch 122 is used to initiate a zero function while the other three switches 122 are used for setup function programming and data review. However, it will be appreciated that other display and control configurations may be used as desired.

In one exemplary, non-limiting embodiment, the display 124 is suitably a 5×7 dot character vacuum florescent display that is configured as 16 characters by 2 lines. The characters are suitably 5 mm in height. The VFD operates off a single 5 volt supply and typically draws about 130 mA. In one embodiment, there are four levels of brightness settings for blue-green display pixels that are suitably preset for optimum viewing. Input data is in ASCII format with an extended character font supporting 237 characters total. The interface to the display has 3 control lines and an 8 bit data buss provided directly from the processor 22. The programmed data is byte serial for the character generator row and column selection. The VFD 124 can be powered down when not in use to conserve energy and minimize battery drain.

Base Unit

Referring now to FIGS. 1 and 11, the base unit 14 holds the hand-held measurement 12 in a cradle 130 when not in use and charges the battery of the hand-held measurement unit 12. The base unit 14 also suitably includes connectors for uploading and downloading data from and to the hand-held measurement unit 12 and for communicating with a host computer (not shown) via a communication interface, such as an RS-232 interface. DC power for the base unit 14 is provided by an external power supply (not shown) suitably capable of supplying 12±1 volts and 2.7 amperes maximum. The external power supply regulates the output conditions at AC line voltages of 90 to 240 volts and frequencies of 47 to 63 Hz. Electrical power is connected to voltage input terminals of a battery charger 126 through a solid state switch 128. The switch 128 does not turn on power to the charger 126 until a "battery in cradle" sense signal is detected. When the sense signal goes low, the switch 128 stops providing power to the charger voltage input.

The battery charger 126 charges the battery 110 (FIG. 2) either at a fast charge rate, such as 1.5 amperes, if the battery 110 is low or at a full-charge voltage rate to 8.4 volts if the battery 110 is not faulty. When the hand-held measurement unit 12 is set in the cradle 130, a "battery in cradle" sense signal connects power to the charger 126 to begin the charging cycle. When battery charging is initiated, the charger 126 enters a pre-qualification state. In this state, the cells of the battery 110 are charged at $1/10$ of the programmed current limit while the charger 126 measures the battery 110 to determine if it can be charged. If the battery voltage is above 2.5 volts per cell, battery charging begins.

The battery 110 is charged at a constant current (fast-charge state) rate or a constant voltage (full-charge state). The charger 126 exits the full-charge state and enters a top-off state once the battery current drops to 10% of the fast-charge current, or the fast-charge timer expires. The charger remains in the top-off state for 45 minutes, after which charging is terminated. Once charging is terminated, if the hand-held measurement unit 12 is still in the base unit 14 and the battery voltage drops 5% from the fully charged voltage level, charging will automatically restart. If the charger 126 is unable to enter the fast-charge or full-charge states, charging is terminated and a battery fault LED indicator (not shown) will be illuminated on the base unit 14.

When the hand-held measurement unit 12 is connected to the base unit 14, the system 10 automatically powers down system analog functions, such as signal conditioning and measurement, but initially maintains power for digital functions, such as programming and communications functions. The power for these functions is derived from the battery terminals even though the battery 110 has entered a charging state.

Host Computer

Figure 12:
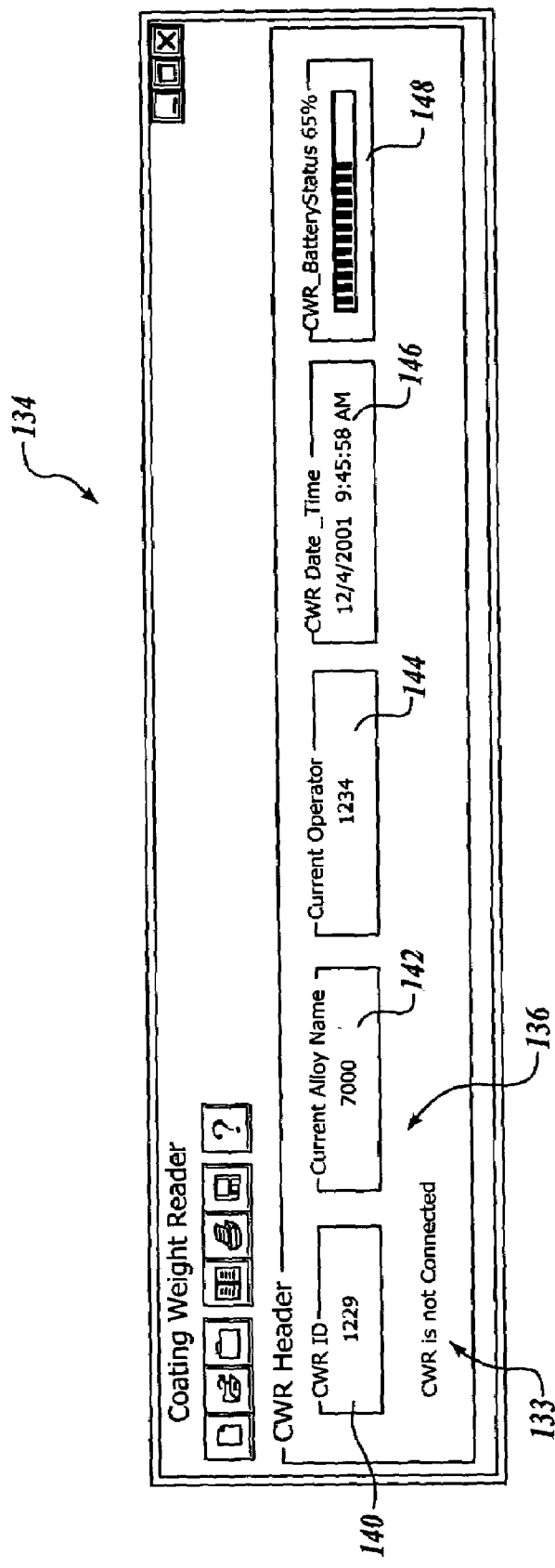
FIGS. 12–21 are screen shots of exemplary pages presented by an embodiment of the invention.

Referring back to FIG. 2, if desired a host computer 132 is suitably connected to the base unit 14 via an acceptable interface, such as an RS-232 interface. The host computer 132 is suitably any computing platform known in the art, such as without limitation a desk-top computer, a laptop computer, a mainframe computer, a hand-held or palmtop computer, a suitable personal data assistant (PDA), or the like. The host computer 132 performs data analysis and display as discussed below in reference to FIGS. 12–21. Referring now to FIG. 12, a screen 134 shows a header and tool bar 136 for the system 10. The header and tool bar 136 shows the hand-held measurement unit 12 connection status in a status field 138 and, if connected, displays hand-held measurement unit 12 status information. The status information includes the system 10 unit ID in a field 140, currently selected alloy name in a field 142, currently selected operator number in a field 144, date and time in a field 146, and battery charge level in a field 148.

Figure 13:
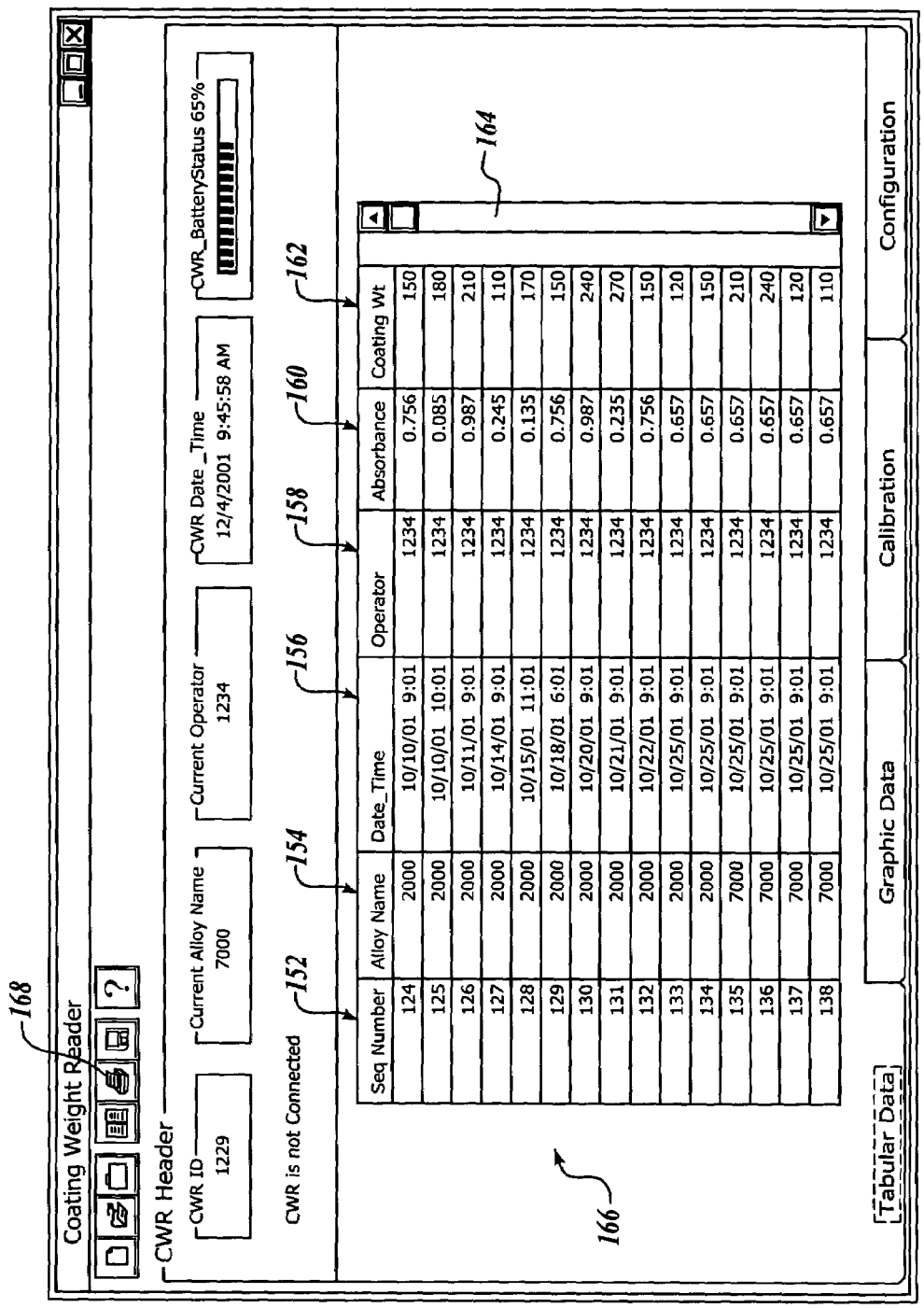

Referring now to FIG. 13, a tabular data page 150 displays currently-loaded coating weight data in tabular form. The data is displayed in ascending sequence number order. The following fields are displayed: sample sequence number in a column 152; alloy name in a column 154; date and time in a column 156; operator number in a column 158; measured absorbance in a column 160; and calculated coating weight in a column 162. Vertical scroll bars 164 are located on a right hand side of a display window 166 to allow scrolling of the tabular data if all of the data does not fit in the display window 166. A print button 168 provides a complete printout of the tabular data page.

Figure 14:
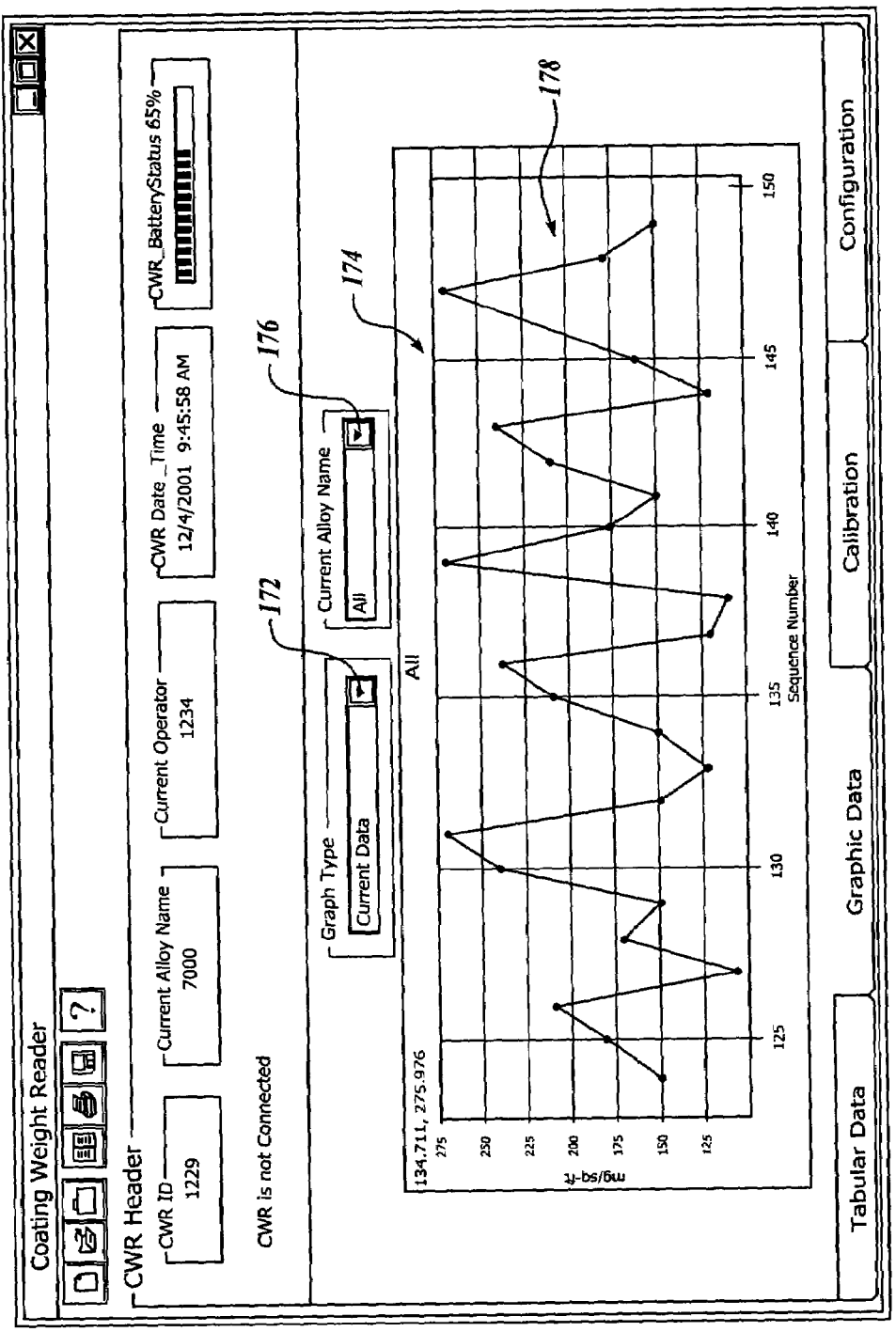

Referring now to FIG. 14, a graphical data page 170 provides for graphical display of current data in graphical format. The graphical data page 170 also supports several statistical quality control charts. Graph type is selected from a drop down list 172 that is located above a chart area 174. Advantageously, data can be displayed in a variety of formats. Right mouse button functionality is suitably used to access further graphical options when the graphical page 170 is displayed. A desired graph type is first selected from the drop down list 172 and then a right mouse button is clicked to access options that pertain to that graph.

A second drop down list 176 is available to filter current data by alloy type, or to select all alloys. The drop down list 176 suitably includes all alloy names in the current dataset if multiple alloys are present.

Figure 15:
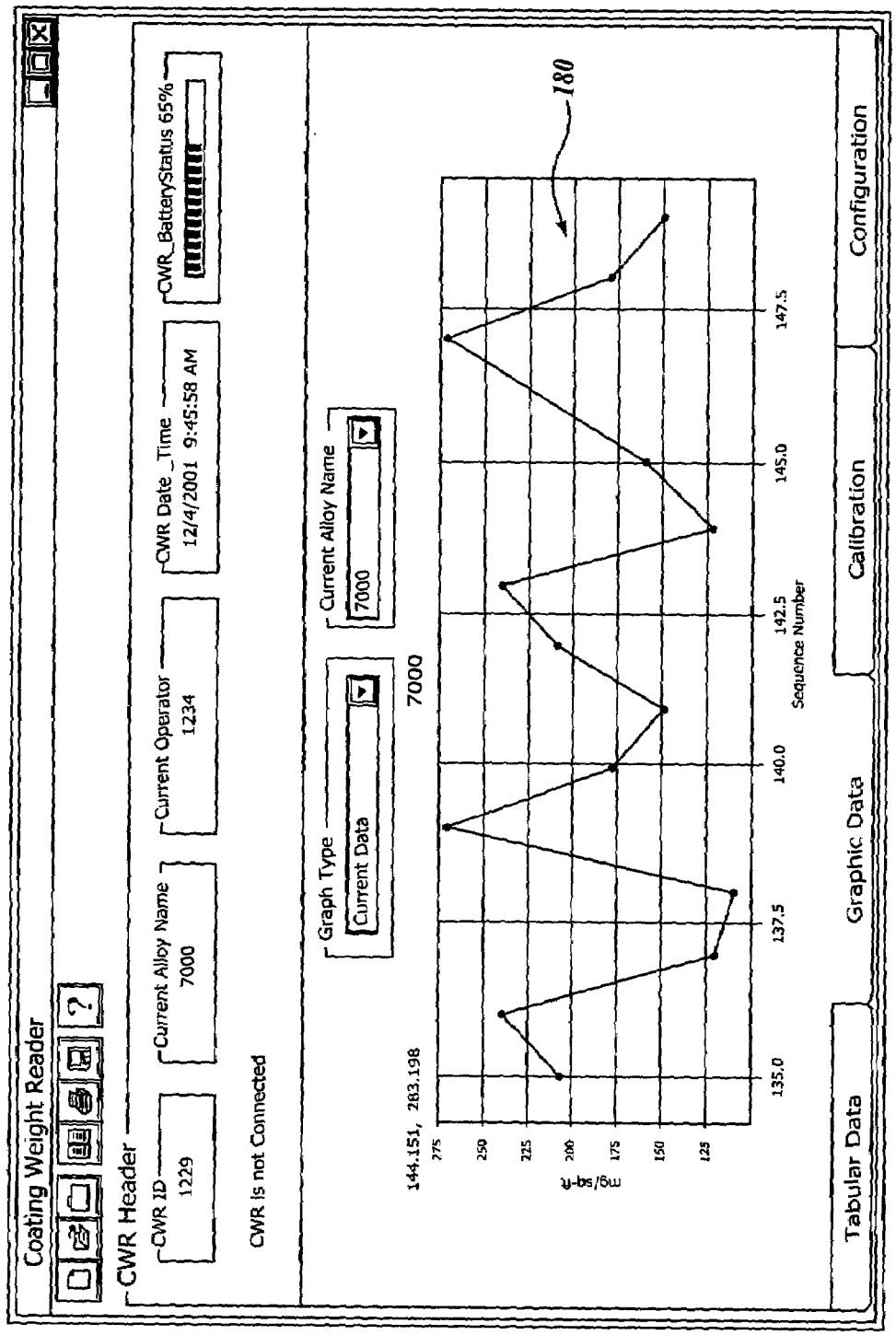

Current data can be graphed in a variety of formats, including line and bar. A best fit line or a best fit curve can be included. Placing the mouse along the graph displays the current x and y values for the mouse position above the graph. Double clicking the left mouse button over a data point displays the exact x and y values for that point. FIG. 14 shows a line graph 178 of current data selected for all alloys. FIG. 15 shows a line graph 180 of current data filtered for alloy 7000.

Figure 16:
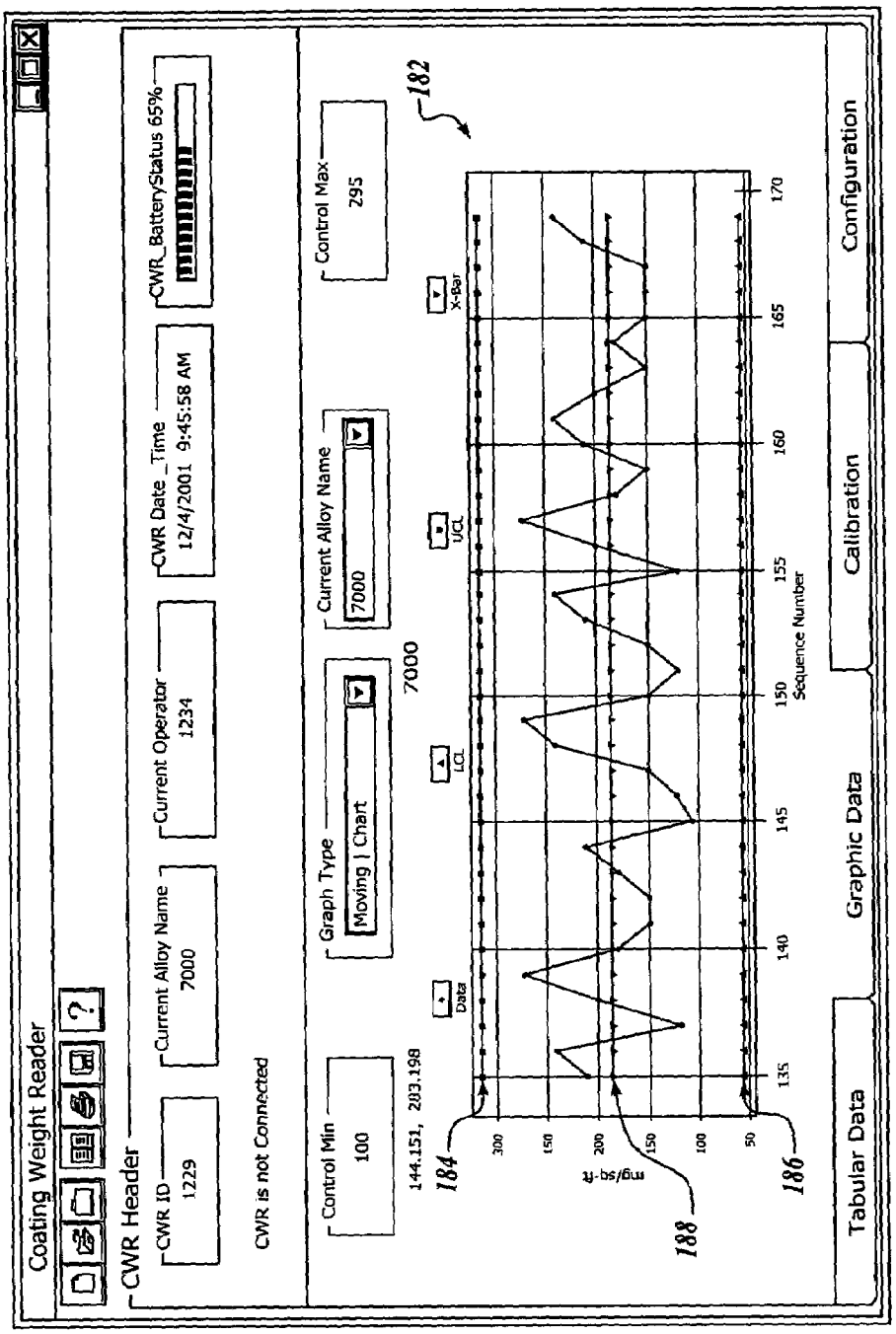

Referring now to FIG. 16, a "Moving I" chart 182 plots the last "n" values. The value for n is TBD. The purpose of this chart is to look for "out-of-control" conditions, such as without limitation: values above or below an upper control limit (UCL) 184 or a lower control limit (LCL) 186; 7 values in a row above or below a midpoint 188; 12 out of 14 or 11 out of 13 values above or below the midpoint 188; or trends in the data, such as steady up/down, zig-zag, blocks of similar or dissimilar data, sudden changes, or step changes.

Figure 21:
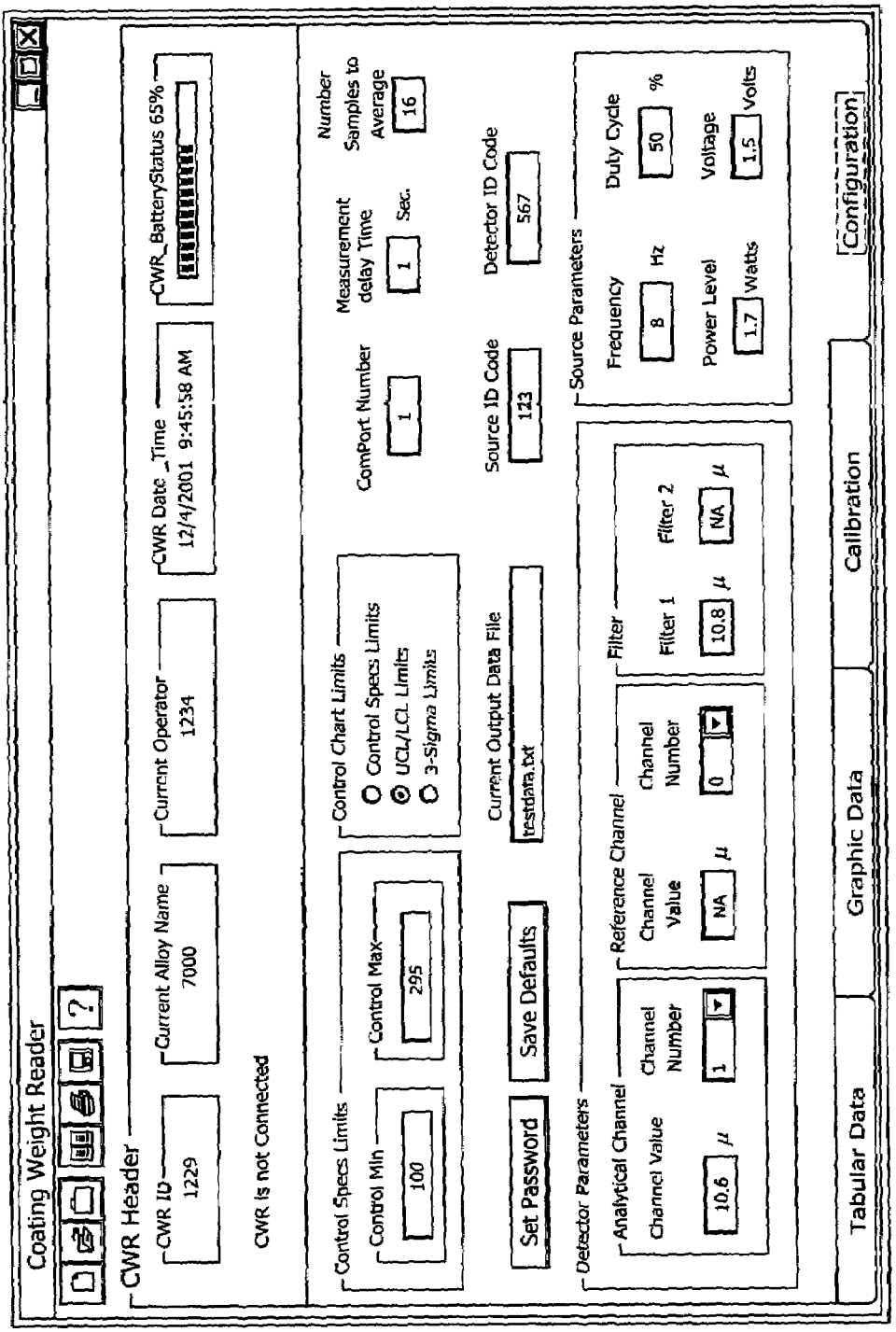

There are three exemplary methods of defining control limits of the Moving I chart 182: UCL/LCL, 3-sigma, and control specs. The control limit method is suitably defined using option buttons 188 on a configuration page (FIG. 21). The following calculations are suitably used for the Moving I Chart 182:

Mid Y=Average of the $Y_i$ $UCL$=Mid $Y$+2.66*Sum($|Y_{i-1}-Y_i|$)/($n-1$)

Figure 17:
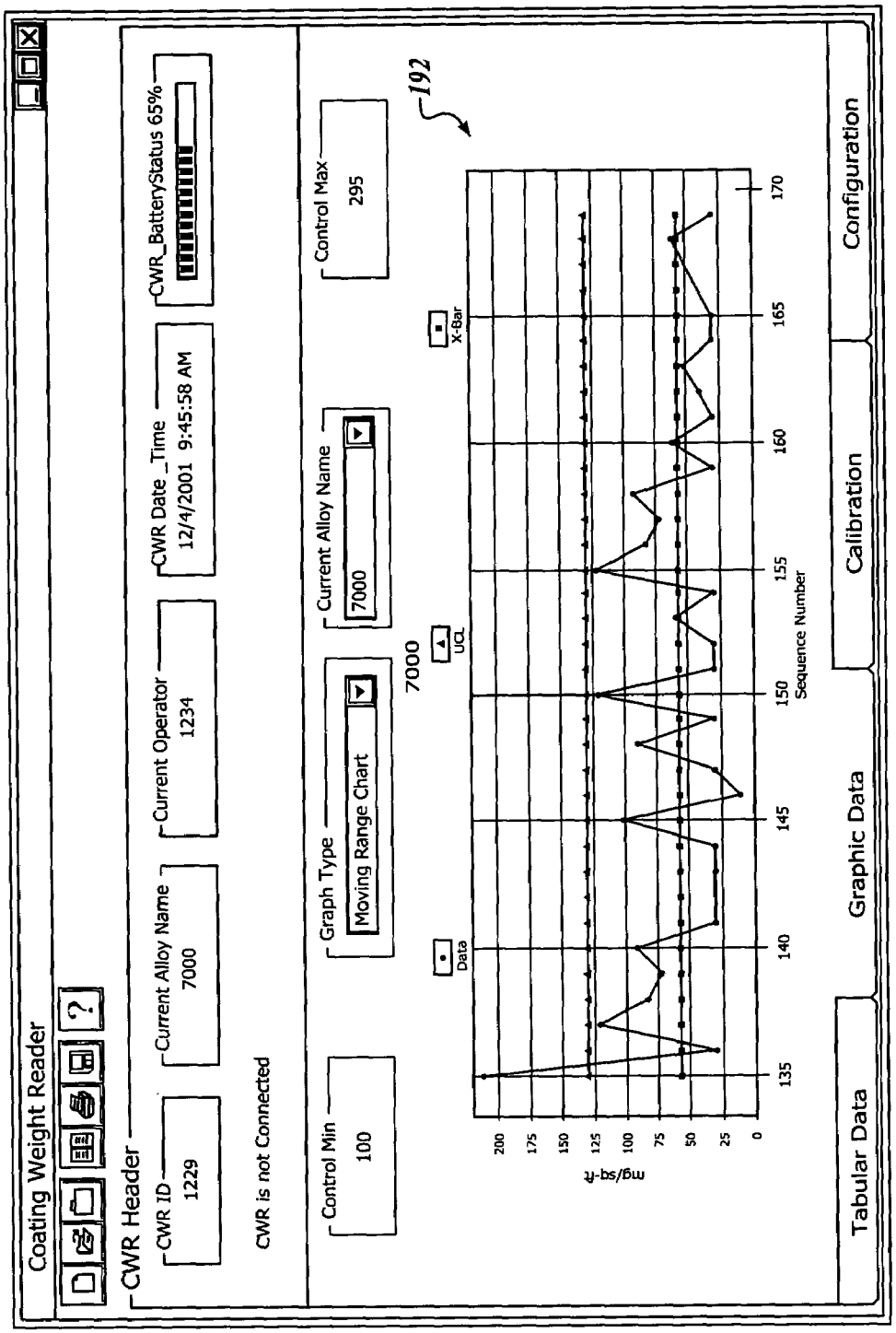

Referring now to FIG. 17, a "Moving Range" chart 192 plots absolute value of $(Y_i-Y_{i-1})$ values. The "Moving Range" chart 192 shows the same type of information as the "Moving I" chart 182 (FIG. 16) except the Moving Range chart 192 shows a difference between two adjacent values.

This indicates repeatability and control over a short time, and can advantageously show a technician change or calibration change.

There are three exemplary methods of defining control limits of the Moving Range chart 192: UCL/LCL, 3-sigma and control specifications. The control limit method also can be defined using the option buttons 188 on the configuration page 190 (FIG. 21). The following calculations are used for the Moving Range Chart 192:

$$R = \text{Sum } (|Y_{i-1} - Y_i|)/(n)$$

$$UCL = 3.27 * R$$

Figure 18:
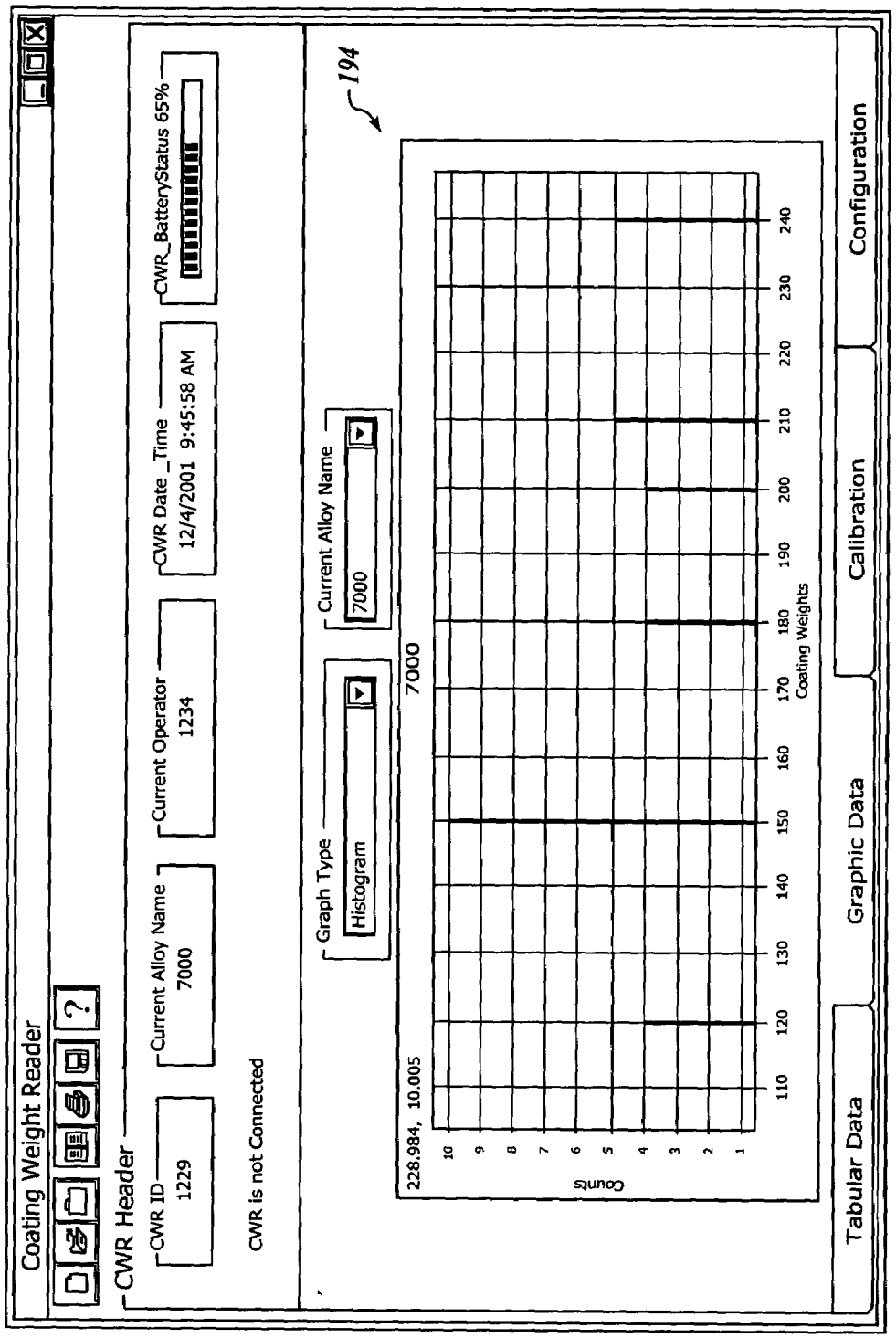

Referring now to FIG. 18, a "Histogram" chart 194 plots a number of values for a given $Y_i$ value. The "Histogram" chart 194 shows patterns in a data grouping, such as: narrow bell-curve vs. broad bell-curve; single-curve vs. dumbbell-curve shape; or skewed-curve to one side or the other of a 'Normal' bell-curve; single spike within a curve (usually off the center point). The "Histogram" chart 194 is suitably prepared by fixed number of bars, fixed range for the bars, or allowed to float to the data.

Figure 19:
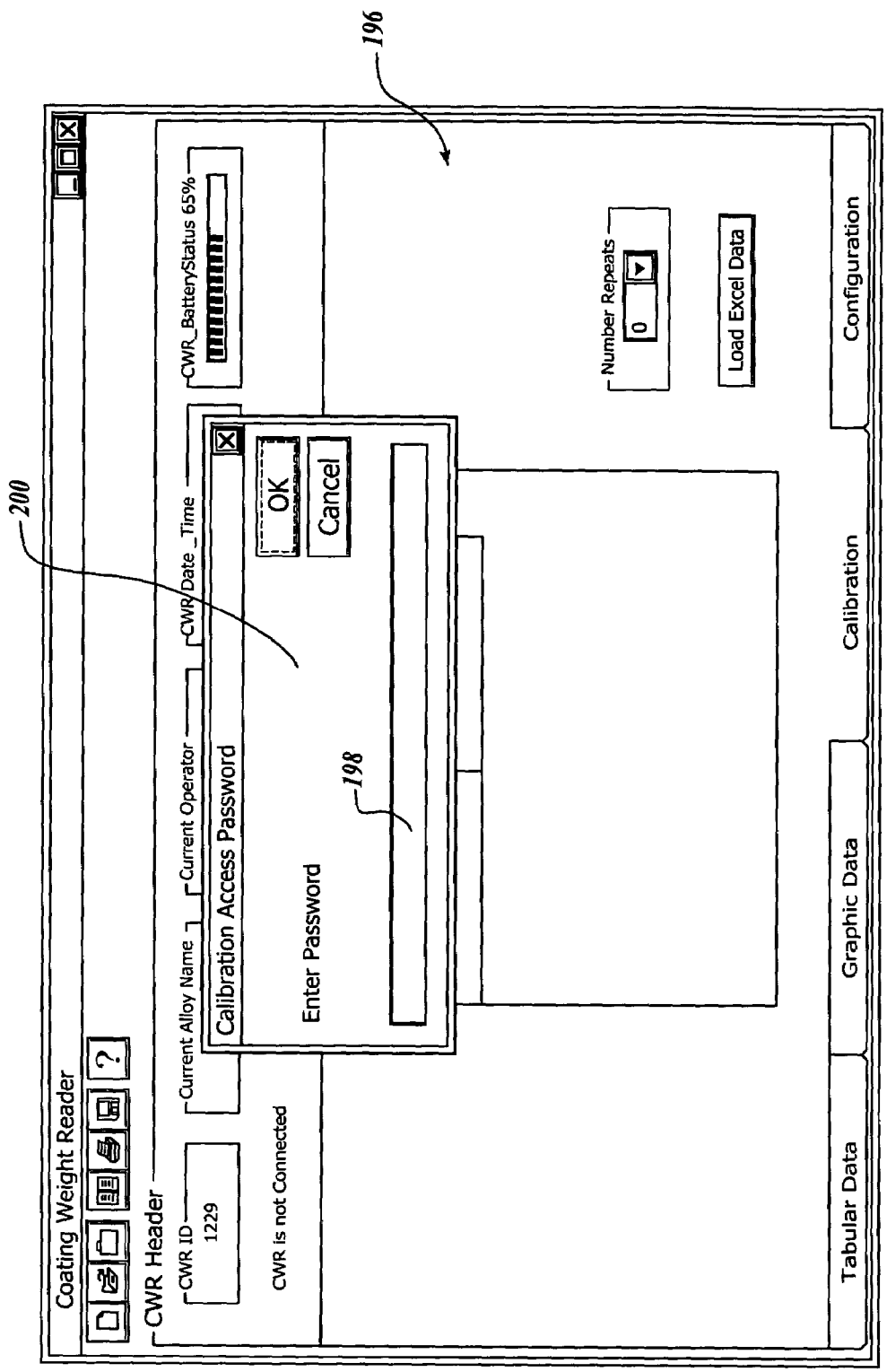
Figure 20:
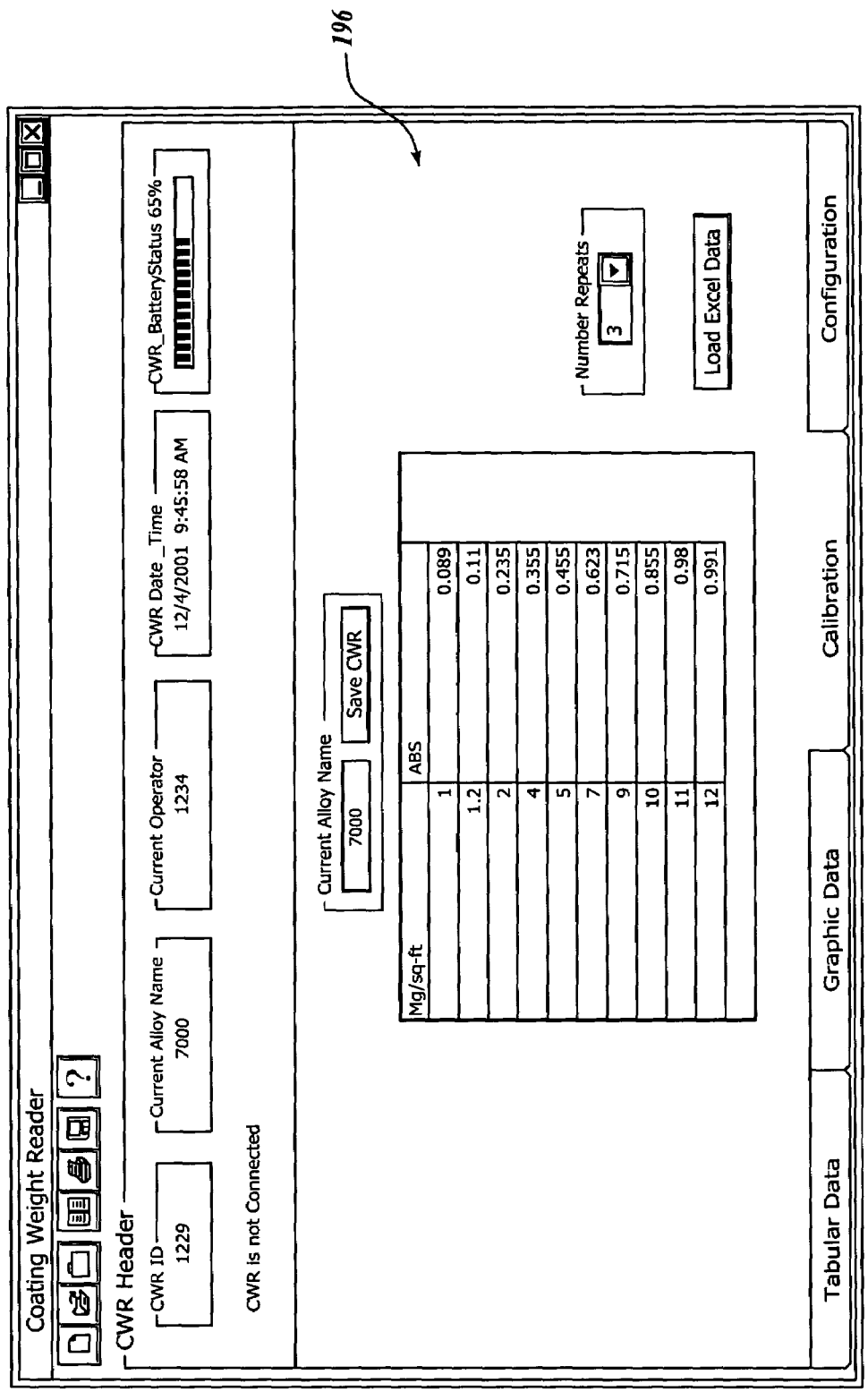

Referring now to FIGS. 19 and 20, a calibration page is used to create calibration curves from raw absorbance data collected with the hand-held measurement unit 12. The calibration page 196 is suitably password protected. In such an exemplary embodiment, a password is entered into a field 198 in password entry screen 200.

Raw data received from the hand-held measurement unit 12 can be used for the calibration page 196, or data can be imported from a suitable computer software application file, such as without limitation a Microsoft Excel file or the like. For raw data, an operator enters the number of values to average for each table entry and the number of entries. The data collection file contains the correct number of repetitive samples for each calibration point and the data is in increasing coating thickness order. The user then enters the coating thickness values to be associated with each calibration point and the alloy name. The data can then be saved to a host file. It can also be downloaded to a calibration table stored in the hand-held measurement unit 12. For computer software application files, the table is loaded directly from the first two columns of the spreadsheet.

Referring now to FIG. 21, the configuration page 190 displays all of the system 10 configuration information and allows the operator to modify certain parameters. The configuration page 190 is also suitably password protected. The following items can be configured: a communications port for accessing the system 10 (such as COM1–COM4); measurement delay time from recognition of the run trigger and the start of data sampling; number of data samples to average for each measurement (one sample is obtained for each source period); source frequency, duty cycle, initial voltage and power control level (these are predetermined for each source); detector channel definition and filter information (the channel information is configurable for one or two channels, and either channel can be the analytical or reference channel); and SQC control chart limit method and the control limits for the user specified option.

Operation

Figure 22A:
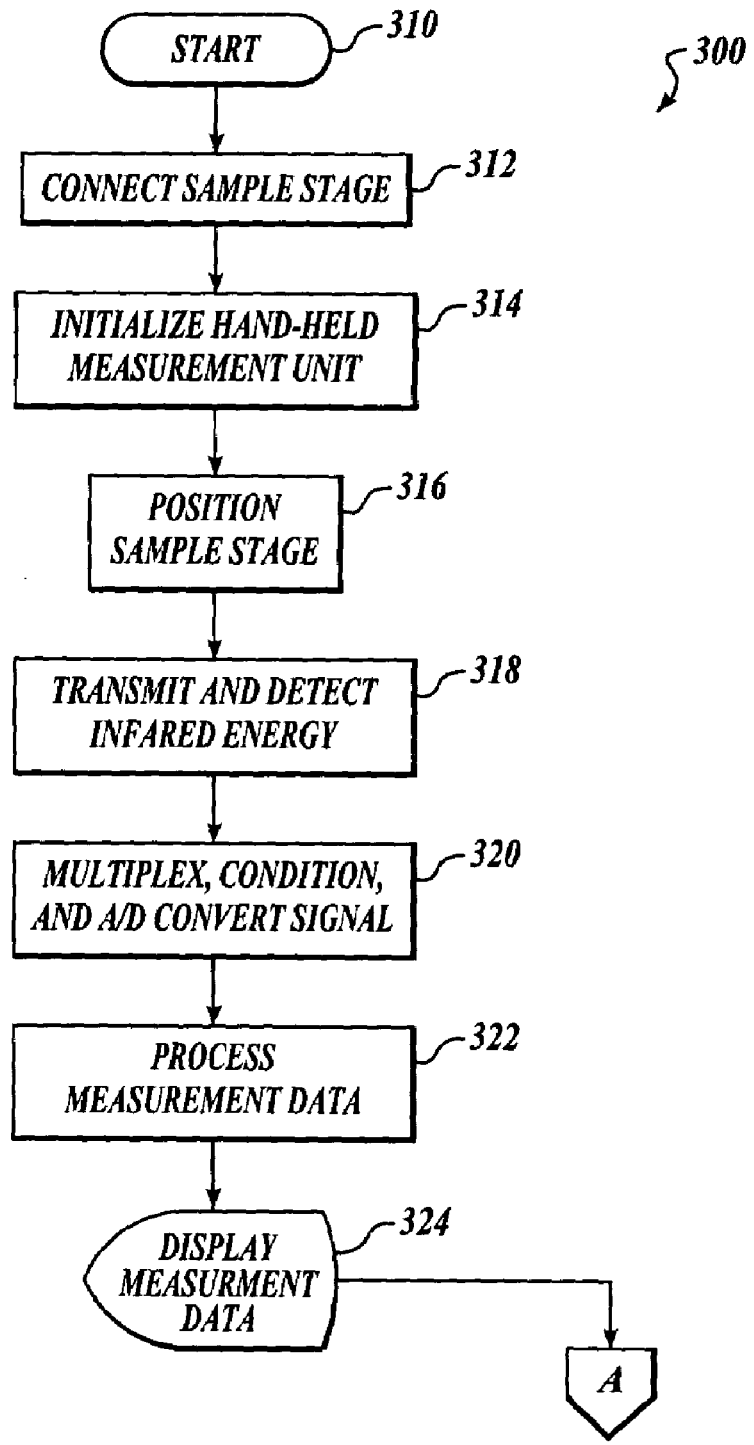
FIGS. 22A and 22B are flow charts of a routine performed according to an embodiment of the invention.
Figure 22B:
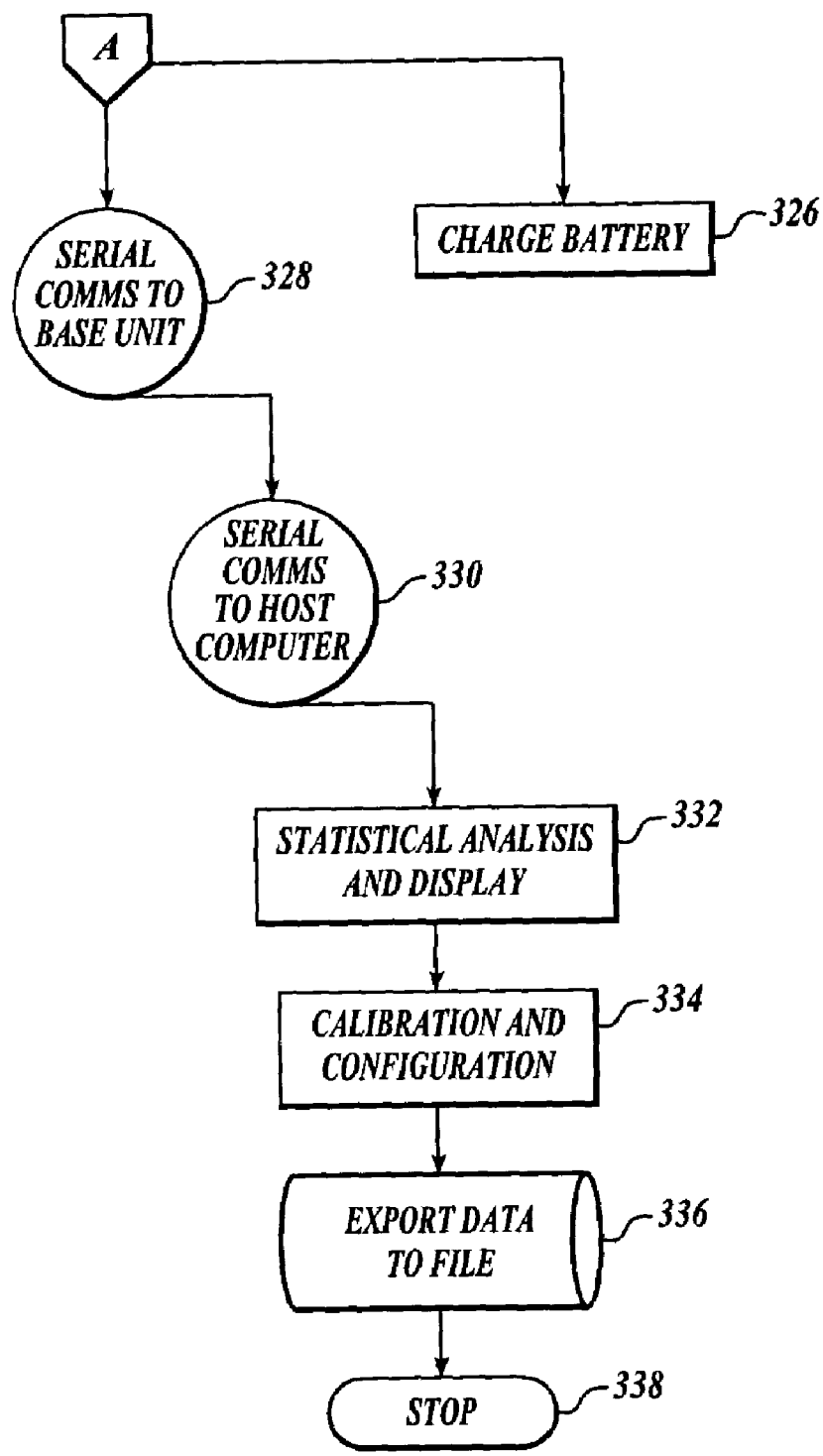

Referring now to FIGS. 22A and 22B, the system 10 operates as follows. A routine 300 starts at a block 310 at which the hand-held measurement unit is retrieved from the cradle 130 of the base unit 14. At a block 312, the sample stage 34 (whose memory 42 includes configuration and calibration data for the alloy to be measured) is selected. The selected sample stage 34 is inserted into the hand-held measurement unit 12 and is electrically connected via the interface circuit 44.

At a block 314, the hand-held measurement unit 12 is initialized. Battery power is applied and the processor 22 begins a power-up initialization sequence. Calibration and configuration data for the alloy to be measured is loaded from the sample stage memory 42.

At a block 316, the sample stage 34 is positioned for measurement. The standoff pads 36 are placed against the sample to be measured and the sample stage is rotated as desired via the rotating component 38. This maintains the sample stage 34 and the hand-held measurement unit 12 in place for subsequent measurements.

At a block 318, the trigger switch 118 is activated. Power is applied to the infrared source 18. Infrared energy is generated by the infrared source 18, passes through the window 37, travels through and is partially absorbed by the coating 24, reflects off the substrate 28, again travels through and is partially absorbed by the coating 24, again passes through the window 37, is filtered by the filter 30, and is detected by the detector 20.

At a block 320, analog output signals from the detector 20 are multiplexed by the input stage 50, conditioned by the conditioning stages 64 and 66, and analog-to-digital converted by the conversion circuit 98.

At a block 322, the processor 22 processes data received from the conversion circuit 98. The signal received from the conversion circuit 98 is indicative of a value Ia of infrared energy detected by the detector 20. The processor 22 determines absorbance Abs according to the relationship Abs=logIo/Ia, where Io is a value of a reference wavelength output of infrared energy reflected by the alloy without any coating on the alloy. Advantageously, To is stored in the sample stage memory 42 and is loaded into the system memory 108 upon initialization for subsequent use by the processor 22 in performing the absorbance calculation. The processor 22 correlates the value of absorbance Abs to an amount, such as thickness or weight, of the coating 24. The processor 22 maps or extrapolates the value Abs to a predetermined value of thickness or weight of the coating 24, as desired, that is stored in the sample stage memory 42 and loaded into the system memory 108 upon initialization.

At a block 324, the weight or thickness of the coating 24 is displayed on the display 124. Suitable meta-information may also be displayed on the display 124, as desired. For example, displayed meta-information may identify the alloy being measured, the operator performing the measurements, and a number identifying the measurement being performed.

At a block 326, the battery 110 is charged by charging circuits in the base unit 14. It will be appreciated that charging at the block 326 occurs when the hand-held measurement unit 12 is received within the cradle 130.

At a block 328, data is communicated between the hand-held measurement unit 12 and the base unit 14 over a serial communications interface, such as an RS-232 interface. The communicated data suitably includes measurement data and meta-information as described above.

At a block 330, data is communicated between the base unit 14 and the optional host computer 134 over a serial communications interface, such as an RS-232 interface. At a block 332, the host computer 134 performs statistical analysis of the measurement data and displays the measurement data in suitable chart and graphical formats as described above. At a block 334, calibration and configuration data is displayed and, if desired, may be modified. At a block 336, data may be exported to a file in a suitable format, such as Microsoft Excel, for further analysis or for storage or archival purposes. The routine 300 ends at a block 338.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A portable apparatus for non-destructively measuring an amount of a coating on a substrate, the apparatus comprising:
    a portable case configured to be held in a hand of an operator and placed proximate to the coating on the substrate;
    an infrared source received within the case, the infrared source being configured to generate and transmit an infrared beam toward the coating on the substrate at an angle of incidence;
    an infrared detector received within the case, the infrared detector being configured to detect a reflected infrared beam that is specularly reflected off the substrate at an angle of reflectance approximately equal to the angle of incidence; and
    a processor mounted in the case, the processor including:
        a first component configured to determine a value of infrared energy absorbed in the coating; and
        a second component configured to correlate the value of the infrared energy absorbed in the coating to an amount of the coating.

2. The apparatus of claim 1, further comprising a housing configured to mountably receive the infrared source and the infrared detector therein, the housing being removably attachable to the case.

3. The apparatus of claim 2, further comprising a memory device mounted in the housing, the memory device being electrically connectable to the processor.

4. The apparatus of claim 1, wherein the infrared source is configured to generate and transmit a beam of mid-infrared energy.

5. The apparatus of claim 4, wherein the beam of mid-infrared energy comprises a beam having a wavelength between about 8 microns to about 12 microns, inclusive.

6. The apparatus of claim 2, wherein the housing is further rotatably attached to the case.

7. The apparatus of claim 1, further comprising an input/output device.

8. The apparatus of claim 1, further comprising a first circuit configured to condition signals received from the infrared detector.

9. The apparatus of claim 8, further comprising a second circuit configured to analog-to-digital convert the conditioned signals from the first circuit, the second circuit providing digital signals to the processor.

10. A system for non-destructively measuring an amount of a coating on a substrate, the system comprising:
    a portable hand-held measurement unit including:
        a portable ease configured to be held in a hand of an operator and placed proximate to the coating on the substrate;
        a battery configured to provide electrical power to the hand-held measurement unit;
        an infrared source received within the case, the infrared source being configured to generate and transmit an infrared beam toward the coating on the substrate at an angle of incidence;
        an infrared detector received within the case, the infrared detector being configured to detect a reflected infrared beam that is specularly reflected off the substrate at an angle of reflectance approximately equal to the angle of incidence;
        a processor mounted in the case, the processor including:
            a first component configured to determine a value of infrared energy absorbed in the coating; and
            a second component configured to correlate the value of the infrared energy absorbed in the coating to an amount of the coating; and
    a base unit configured to removably receive the hand-held measurement unit, the base unit including a battery charger configured to charge the battery of the hand-held measurement unit.

11. The system of claim 10, further comprising a housing configured to receive the infrared source and the infrared detector therein, the housing being removably attachable to the case.

12. The system of claim 11, further comprising a memory device mounted in the housing, the memory device being electrically connectable to the processor.

13. The system of claim 10, infrared source is configured to generate and transmit a beam of mid-infrared energy.

14. The system of claim 13, wherein the beam of mid-infrared energy comprises a beam having a wavelength between about 8 microns to about 12 microns, inclusive.

15. The system of claim 11, wherein the housing is further rotatably attached to the case.

16. The system of claim 10, further comprising an input/output device.

17. The system of claim 10, further comprising a first circuit configured to condition signals received from the infrared detector.

18. The system of claim 17, further comprising a second circuit configured to analog-to-digital convert the conditioned signals from the first circuit, the second circuit providing digital signals to the processor.

19. A system for non-destructively measuring an amount of a coating on a substrate, the system comprising:
    a portable hand-held measurement unit including:
        a portable case configured to be held in a hand of an operator and placed proximate to the coating on the substrate;
        an infrared source received within the case, the infrared source being configured to generate and transmit an infrared beam toward the coating on the substrate at an angle of incidence;
        an infrared detector received within the case, the infrared detector being configured to detect a reflected infrared beam that is specularly reflected off the substrate at an angle of reflectance approximately equal to the angle of incidence;
        a processor mounted in the case, the processor including:
            a first component configured to determine a value of infrared energy absorbed in the coating; and
            a second component configured to correlate the value of the infrared energy absorbed in the coating to an amount of the coating; and
        a first communications interface; and a base unit configured to removably receive the hand-held measurement unit, the base unit including:
    a second communications interface configured to exchange data with the first communications interface; and
    a third communications interface.

20. The system of claim 19, further comprising a computing device electrically coupled to the base unit, the computing device including:
    a fourth communications interface configured to exchange data with the third communications interface;
    a third component configured to analyze data from the hand-held measurement unit; and
    a display device.

21. The system of claim 20, wherein the first, second, third, and fourth communications interfaces include RS-232 interfaces.

22. The system of claim 19, wherein the analyzed data is displayed in at least one of a tabular format, a graphical format, a line chart, and a bar chart.

23. The system of claim 19, wherein the infrared source is configured to generate and transmit a beam of mid-infrared energy.

24. The system of claim 23, wherein the beam of mid-infrared energy comprises a beam having a wavelength between about 8 microns to about 12 microns, inclusive.

25. The system of claim 23, wherein the beam of mid-infrared energy comprises a beam having a wavelength of about 10.8 microns.

26. The system of claim 19, wherein the analyzed data is displayed in at least one of a moving I chart, a moving range chart, and a histogram.

27. The system of claim 19, wherein the infrared detector includes a pyroelectric detector.

28. The system of claim 19, wherein the angle of incidence is within a range of about 55 degrees to about 75 degrees, inclusive.

29. The system of claim 20, wherein the third component is further configured to receive at least one of calibration data and configuration data.

30. The system of claim 19, further comprising a housing configured to mountably receive the infrared source and the infrared detector therein, the housing being removably coupleable within the case.

31. An apparatus for housing optical components of a system for measuring an amount of a coating on a substrate using absorbance of infrared energy, the apparatus comprising:
    a housing that is removably attachable to a case of a system for non-destructively measuring the amount of the coating on the substrate using absorbance of infrared energy;
    an infrared source mounted in the housing, the infrared source being configured to generate and transmit an infrared beam toward the coating on the substrate at an angle of incidence;
    an infrared detector mounted in the housing, the infrared detector being configured to detect a reflected infrared beam that is specularly reflected off the substrate at an angle of reflectance approximately equal to the angle of incidence; and
    an electrical interface connection configured to electrically connect the infrared source and the infrared detector to the system for measuring the amount of the coating on the substrate using absorbance of infrared energy.

32. The apparatus of claim 31, further comprising a memory device mounted in the housing, the memory device being electrically connectable to the processor.

33. The apparatus of claim 31, wherein the infrared source is configured to generate and transmit a beam of mid-infrared energy.

34. The apparatus of claim 33, wherein beam of mid-infrared energy comprises a beam having a wavelength between about 8 microns to about 12 microns, inclusive.

35. The apparatus of claim 31, wherein the housing is further rotatably attached to the system.

* * * * *